United States Patent
Okano et al.

(10) Patent No.: US 12,063,236 B2
(45) Date of Patent: Aug. 13, 2024

(54) INFORMATION PROCESSING APPARATUS, LOG ANALYSIS METHOD AND PROGRAM

(71) Applicant: NIPPON TELEGRAPH AND TELEPHONE CORPORATION, Tokyo (JP)

(72) Inventors: Yasushi Okano, Tokyo (JP); Masashi Tanaka, Tokyo (JP); Takuma Koyama, Tokyo (JP); Keita Hasegawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 518 days.

(21) Appl. No.: 17/283,214

(22) PCT Filed: Oct. 10, 2019

(86) PCT No.: PCT/JP2019/040031
§ 371 (c)(1),
(2) Date: Apr. 6, 2021

(87) PCT Pub. No.: WO2020/075808
PCT Pub. Date: Apr. 16, 2020

(65) Prior Publication Data
US 2021/0377289 A1   Dec. 2, 2021

(30) Foreign Application Priority Data
Oct. 11, 2018   (JP) .................................. 2018-192413

(51) Int. Cl.
*G06F 21/00*   (2013.01)
*H04L 9/40*    (2022.01)

(52) U.S. Cl.
CPC ...... *H04L 63/1425* (2013.01); *H04L 63/1466* (2013.01)

(58) Field of Classification Search
None
See application file for complete search history.

(56) References Cited

U.S. PATENT DOCUMENTS 9,225,730 B1    12/2015  Brezinski
9,516,053 B1 *  12/2016  Muddu ................. G06F 3/0484
(Continued)

FOREIGN PATENT DOCUMENTS

| | | |
|---|---|---|
| JP | 2013-257773 A | 12/2013 |
| JP | 2016-218788 A | 12/2016 |
| WO | 2016/060067 A1 | 4/2016 |

OTHER PUBLICATIONS

Sen Nie et al., "Free-Fall: Hacking Tesla From Wireless to Can Bus", BlackHat, 2017, [online], the Internet <URL:https://www.blackhat.com/docs/us-17/thursday/us-17-Nie-Free-Fall-Hacking-Tesla-From-Wireless-To-CAN-Bus-wp.pdf>.
(Continued)

*Primary Examiner* — Maung T Lwin

(57) ABSTRACT

An information processing apparatus includes a generation unit configured to generate, from a log obtained from a device, a graph structure indicating one or more associations between one or more processes and one or more objects related to the one or more processes, and an identifying unit configured to, in a case where one of objects of the device is specified, identify at least one process related to the
(Continued)

specified one of the objects, based on the generated graph structure, and identify one or more objects related to the identified at least one process.

7 Claims, 22 Drawing Sheets

(56) References Cited

U.S. PATENT DOCUMENTS

| | | | |
|---|---|---|---|
| 9,609,011 B2* | 3/2017 | Muddu | H04L 41/22 |
| 10,237,294 B1* | 3/2019 | Zadeh | H04L 61/45 |
| 10,673,880 B1* | 6/2020 | Pratt | H04L 63/1433 |
| 10,783,241 B2* | 9/2020 | Crabtree | G06F 9/455 |
| 2017/0063910 A1* | 3/2017 | Muddu | G06F 3/0482 |
| 2017/0149814 A1* | 5/2017 | Chen | H04L 41/142 |
| 2017/0223040 A1 | 8/2017 | Ikuse et al. | |
| 2017/0295188 A1 | 10/2017 | David et al. | |
| 2017/0300690 A1 | 10/2017 | Ladnai et al. | |
| 2018/0219888 A1* | 8/2018 | Apostolopoulos | H04L 63/1425 |
| 2018/0278647 A1* | 9/2018 | Gabaev | H04L 63/1425 |
| 2018/0293330 A1 | 10/2018 | Kovac | |
| 2019/0251258 A1* | 8/2019 | Walters | G06F 21/566 |
| 2020/0076840 A1* | 3/2020 | Peinador | G06F 21/552 |

OTHER PUBLICATIONS

Otsuka Satoshi et al., "Intrusion detection method for in-vehicle LAN that does not require modification of existing EUC", The Special Interest Group Technical Reports of Information Processing Society of Japan, vol. 2013-EMB-28 No. 6, pp. 31-35, 2013, with English Machine Translation.

Okano Yasushi et al., "Anomaly detection of message insertion attacks on control area networks using Variance Gamma distribution and Double Gamma distribution", SCIS 2018, 2018, with English Machine Translation.

Wuechner, Tobias, et al., Malware Detection with Quantitative Data Flow Graphs, Proceedings of the 9th ACM symposium on Information, computer and communication security, [online], Jun. 6, 2014, pp. 271-282, retrieved from <URL:https://dl.acm.org/citation.cfm?id=2590319>.

European Patent Application No. 19870781.2, Extended European Search Report mailed Oct. 1, 2021, 6 pages.

* cited by examiner

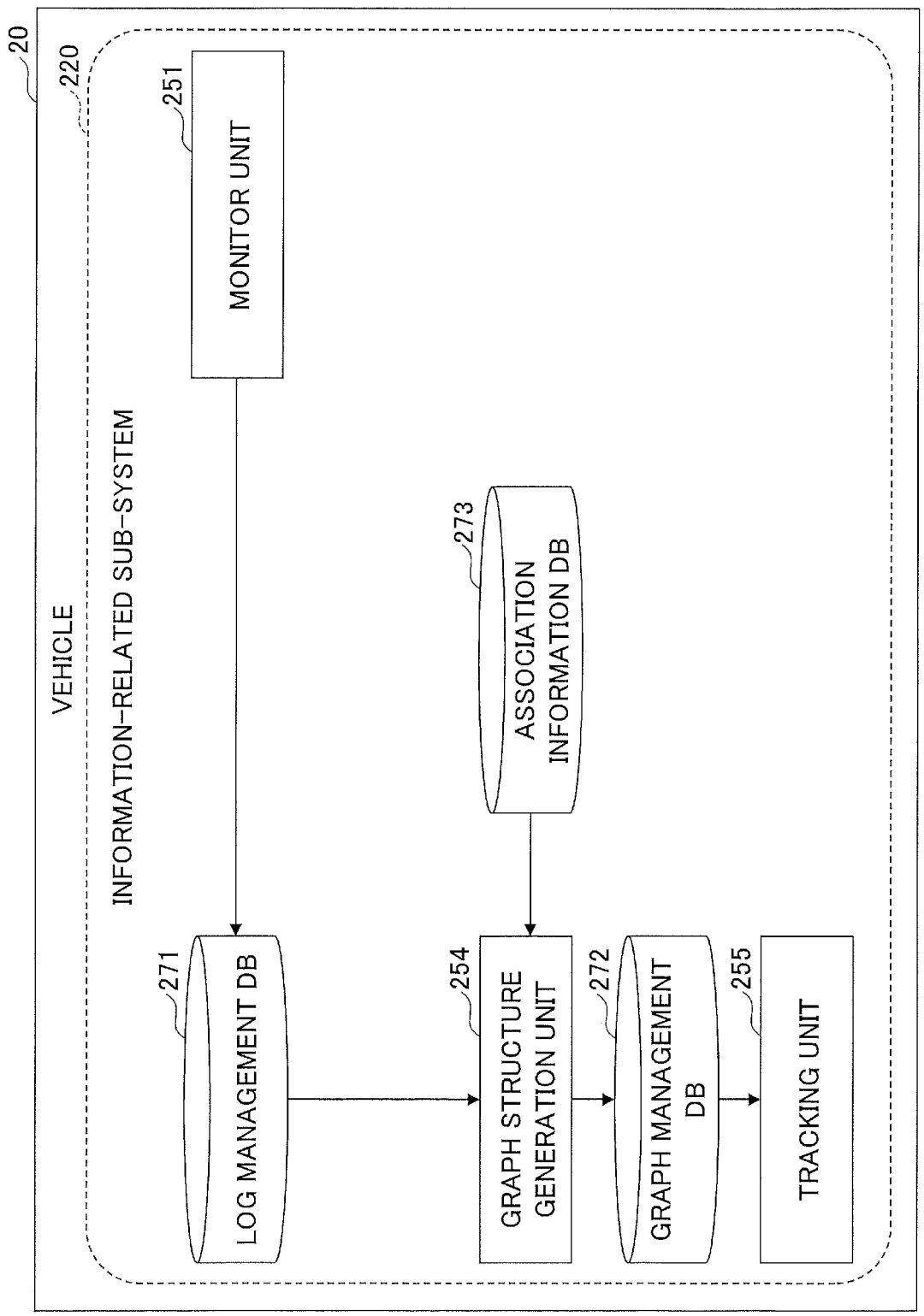

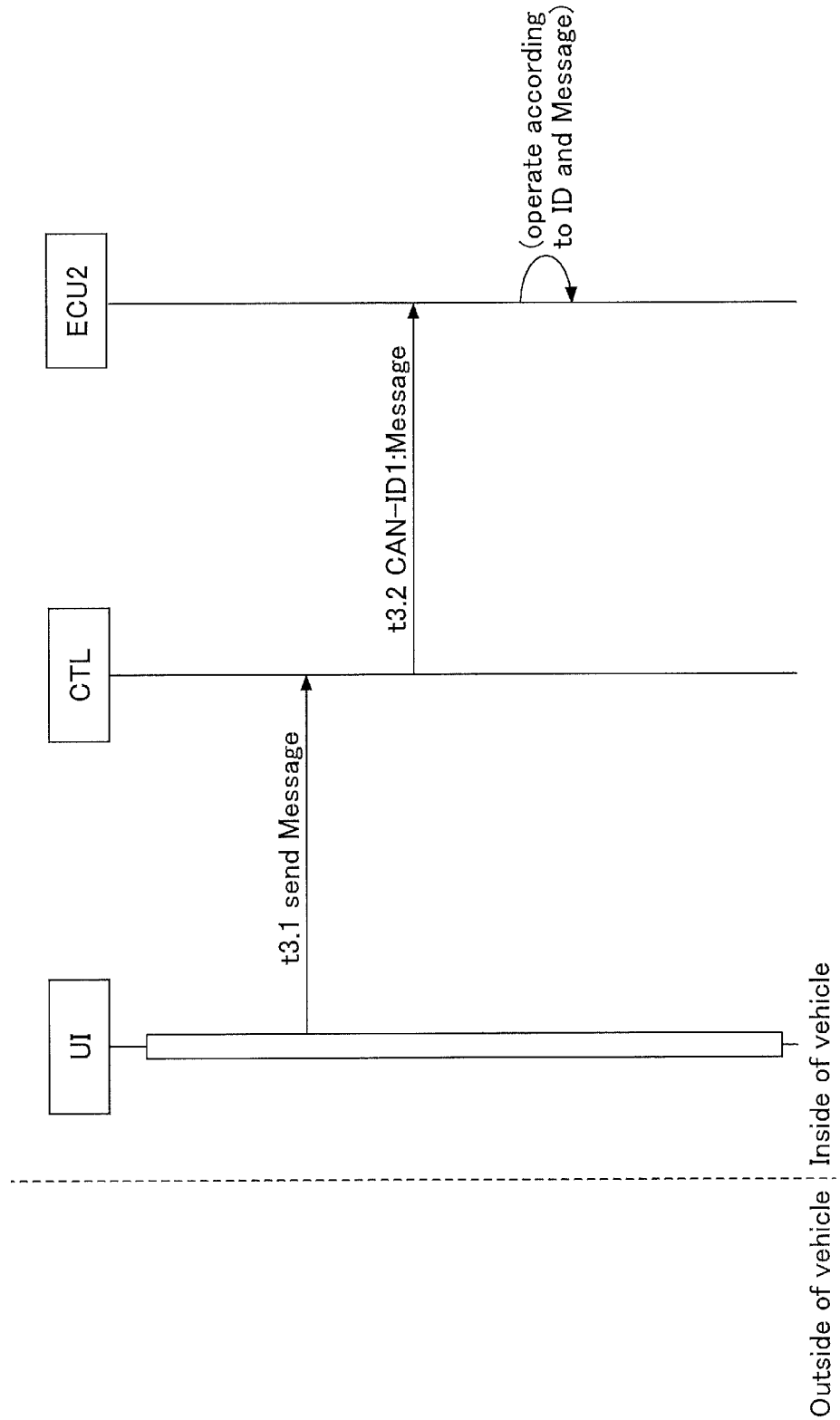

FIG.8

| DATE AND TIME | DEVICE | PROCESS | SRC | DST | ACTION |
|---|---|---|---|---|---|
| t1.1 | TCU | tcu pid1 | IP:ip1:port1 | IP:ota_ip:80 | http://ota_ip/info |
| t1.2 | TCU | tcu pid1 | IP:ip1:port2 | IP:ota_ip:80 | http://ota_ip/download |
| t1.3 | TCU | tcu pid1 | — | FG:FirmwareCTL hash1 | file:write |
| t2.1 | CTL | ota pid1 | — | FG:FirmwareCTL hash1 | file:read |
| t2.2 | CTL | ota pid2 | CAN:ID1 | CAN:ID1 | CAN:update |
| t2.3 | CTL | ctl pid3 | — | — | proc:end |
| t2.3 | CTL | ctl pid4 | FILE:ctl hash2 | ctl pid4 | proc:start |
| t3.1 | UI | ui pid1 | — | CAN:ID1 | CAN |
| t3.2 | CTL | ctl pid6 | CAN:ID1 | CAN:ID2 | CAN |

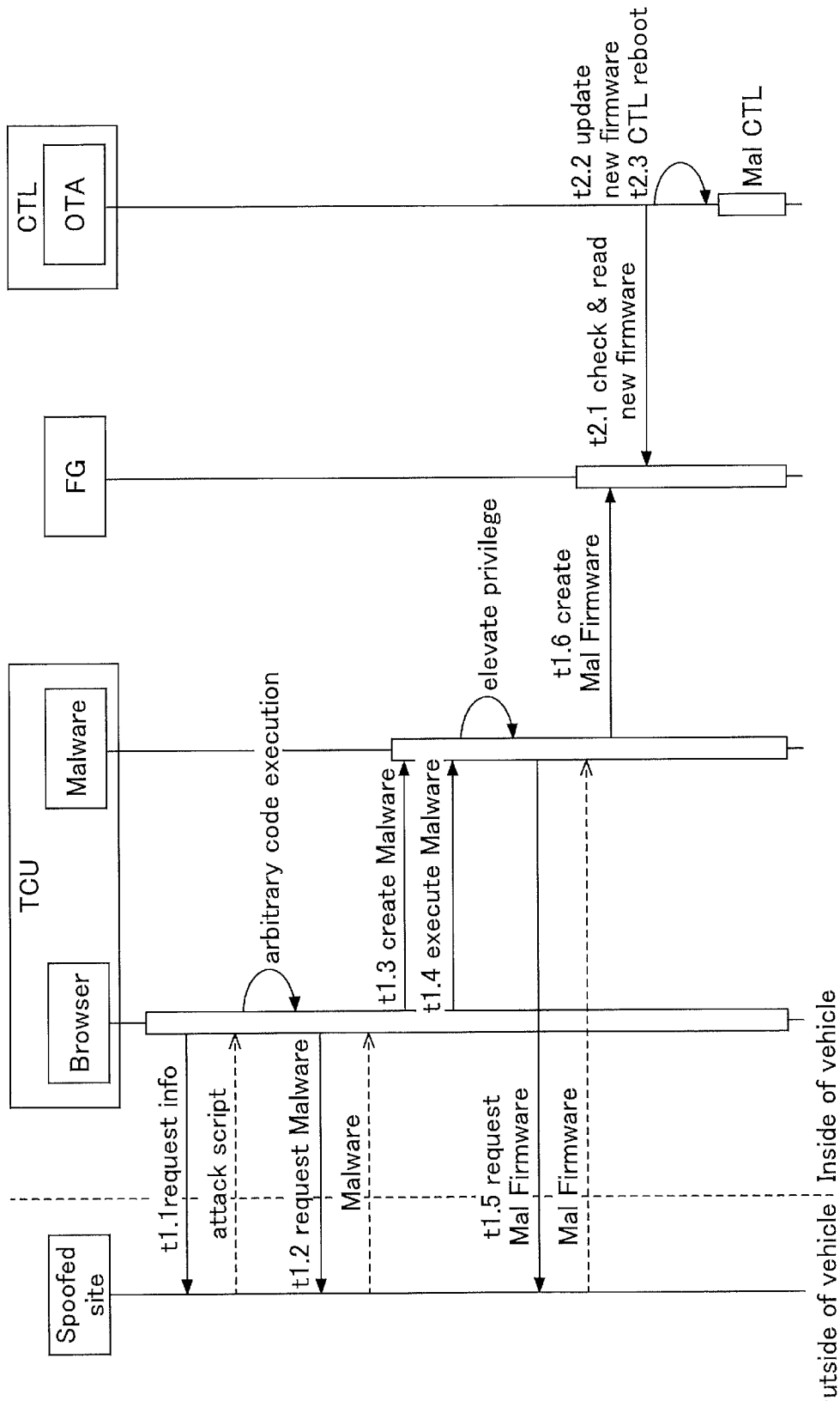

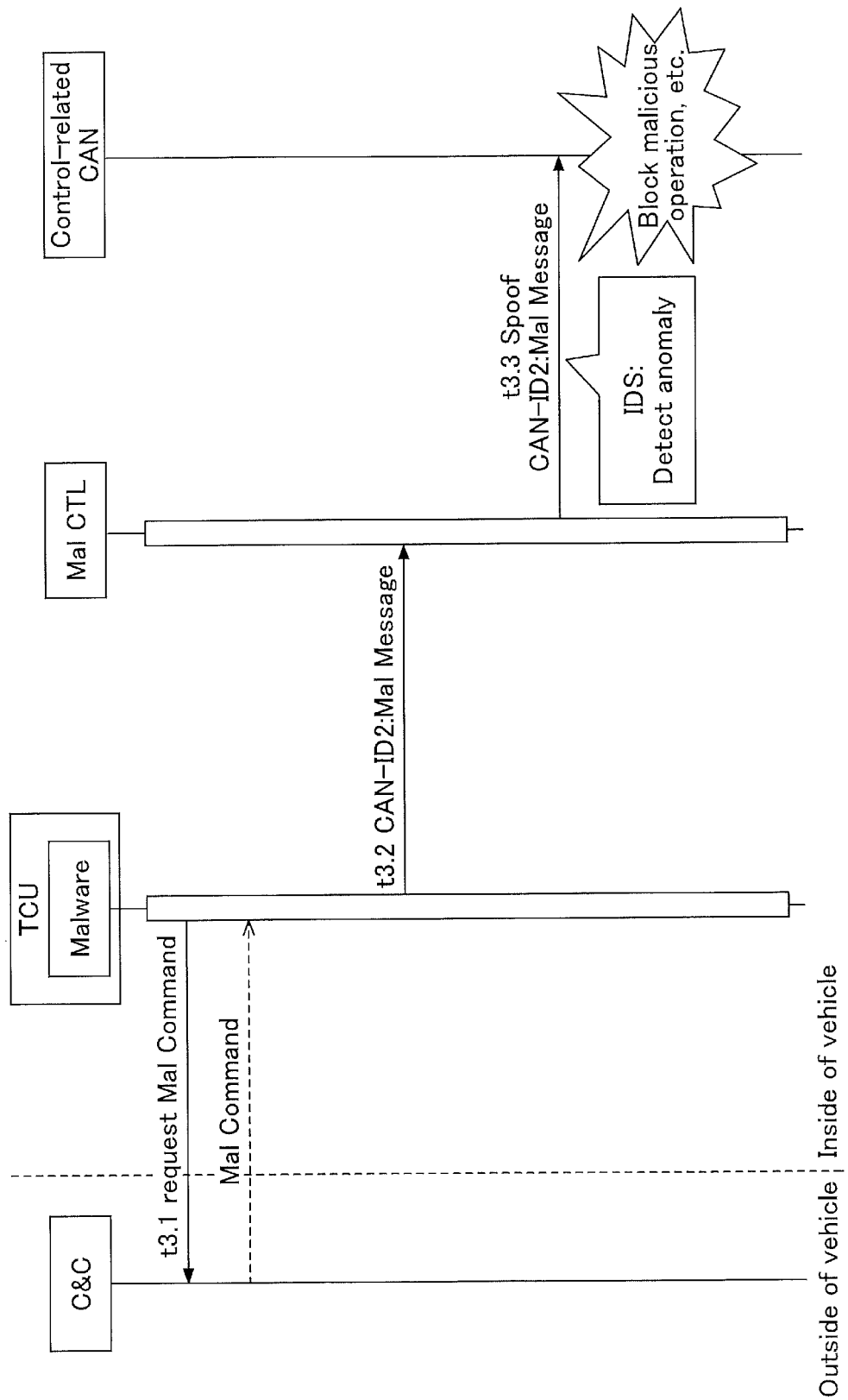

FIG.10

| DATE AND TIME | DEVICE | PROCESS | SRC | DST | ACTION |
|---|---|---|---|---|---|
| t1.1 | TCU | browser pid1 | IP:ip1:port1 | IP:ip2:80 | http://ip2/info |
| t1.2 | TCU | browser pid1 | IP:ip1:port2 | IP:ip2:80 | http://ip2/download |
| t1.3 | TCU | browser pid1 | — | FILE:malware hash1 | file:write |
| t1.4 | TCU | browser pid1 | FILE:malware hash1 | malware pid2 | proc:fork-exec |
| t1.5 | TCU | malware pid2 | IP:ip1:port3 | IP:ip2:80 | http://ip2/FirmwareCTL |
| t1.6 | TCU | malware pid2 | — | FG:FirmwareCTL hash2 | file:write |
| t2.1 | CTL | ota pid3 | — | FG:FirmwareCTL hash2 | file:read |
| t2.2 | CTL | ota pid3 | CAN:ID1 | CAN:ID1 | CAN:update |
| t2.3 | CTL | ctl pid4 | — | ctl pid5 | proc:end |
| t2.3 | CTL | ctl pid5 | FILE:ctl hash3 | ctl pid5 | proc:start |
| t3.1 | TCU | malware pid2 | IP:ip1:port4 | IP:ip3:443 | https://ip3/command |
| t3.2 | TCU | malware pid2 | CAN:ID2 | — | CAN |
| t3.3 | CTL | ctl pid5 | CAN:ID2 | — | CAN |

FIG.12

| OBJECT | PROCESS |
|---|---|
| FG:firmwareCTL | CTL |
| CAN:ID1 | CTL |
| CAN:ID2 | ECU2 |
| FILE:ctl | ota |

FIG.16

| DATE AND TIME | DEVICE | PROCESS | SRC | DST | ACTION |
|---|---|---|---|---|---|
| t4.2 | ECU2 | — | CAN:ID2 | — | DETECT MALFUNCTION |
| t4.3 | CTL | ctl pid4 | — | CAN:ID2 | RECEIVE CAN (MALFUNCTION CODE) |
| t4.4 | CTL | ctl pid4 | CAN:ID1 | | CAN (MALFUNCTION CODE) |

INFORMATION PROCESSING APPARATUS, LOG ANALYSIS METHOD AND PROGRAM

CROSS-REFERENCE TO RELATED APPLICATIONS

This application is a U.S. 371 Application of International Patent Application No. PCT/JP2019/040031, filed on 10 Oct. 2019, which application claims priority to and the benefit of JP Application No. 2018-192413, filed on 11 Oct. 2018, the disclosures of which are hereby incorporated herein by reference in their entireties.

TECHNICAL FIELD

The present invention relates to an information processing apparatus, a log analysis method, and a program.

BACKGROUND ART

Connected cars (vehicles connected to external networks) that are expected to become widely available in the future are expected to improve convenience such as allowing for wireless update of software of electronic control units (ECUs), which was previously handled by car dealers.

On the other hand, there is a concern that, similarly with conventional IT devices, vehicles and their control devices will be the targets of cyber-attacks from malicious attackers when they are connected to external networks. Studies have also been reported that the controller actually provided on a vehicle can be tampered with by access from an external network, and the vehicle control can be taken over by issuing a false instruction from the controller to the ECU (for example, NPL 1).

In order to detect cyber-attacks on a vehicle, an intrusion detection system (IDS) for detecting anomalies in a controller area network (CAN), i.e., a control information network of the vehicle, is being studied (for example, NPL 2, NPL 3).

PRIOR ART DOCUMENTS

Non-Patent Documents

Non-Patent Document 1:
[NPL 1] Sen Nie et al., "FREE-FALL: HACKING TESLA FROM WIRELESS TO CAN BUS", BlackHat, 2017, [online], the Internet <URL:https://www.blackhat.com/docs/us-17/thursday/us-17-Nie-Free-Fall-Hacking-Tesla-From-Wireless-To-CAN-Bus-wp.pdf>
[NPL 2] Otsuka Satoshi et al., "Intrusion detection method for in-vehicle LAN that does not require modification of existing EUC", The Special Interest Group Technical Reports of Information Processing Society of Japan, Vol. 2013-EMB-28 No. 6, pp. 31-35, 2013
[NPL 3] Okano Yasushi et al., "Anomaly detection of message insertion attacks on control area networks using Variance Gamma distribution and Double Gamma distribution", SCIS 2018, 2018

SUMMARY OF INVENTION

Problem to be Solved by the Invention

Although detection of anomalies with the IDS upon an occurrence of a cyberattack to a vehicle is being studied, it is difficult to analyze how the anomalies were caused.

In an example of a cyber-attack disclosed in NPL 1, first, an in-vehicle Web browser accesses a fake site and downloads a malicious code. Thereafter, the malicious code causes fake controller update software to be downloaded, and causes the software of the controller of the vehicle to be updated. As a result, a fake instruction is issued from the controller to the ECU. In this example, the attack vector is temporarily interrupted before and after the fake controller update software is downloaded. In this way, in the cyber-attack to the vehicle, the attack vector from the occurrence of the cyber-attack to the detection of the anomaly may become discontinuous. Even though the IDS can detect an anomaly when a fake instruction is issued to the ECU, the anomaly exists not only in the ECU but also in the attack vector up to the in-vehicle Web browser, and it is difficult to identify the attack vector up to the download of the malicious code, which is the root cause of the anomaly.

It should be noted that the above problem is not limited to vehicles, but is considered to be a common problem for various devices connected to the network. For example, because IoT (Internet of Things) devices can operate as client devices, similarly with a cyber-attack to vehicles, an attack will be carried out before an anomaly is detected, and this may make the attack vector discontinuous. Devices connected to networks are desired to efficiently analyze the affected range of attack vectors and the like. Furthermore, it is desirable to be able to efficiently analyze the affected range not only when an anomaly is detected but also when an external attack is suspected.

The present invention has been made in view of the above issues, and it is an object of the present disclosure to efficiently analyze the affected range of an event specified in a device.

Means for Solving the Problem

In order to solve the above problem, an information processing apparatus includes a generation unit configured to generate, from a log obtained from a device, a graph structure indicating one or more associations between one or more processes and one or more objects related to the one or more processes, and an identifying unit configured to, in a case where one of objects of the device is specified, identify at least one process related to the specified one of the objects, based on the generated graph structure, and identify one or more objects related to the identified at least one process.

Advantage of the Invention

The affected range of an event specified in a device can be efficiently analyzed.

BRIEF DESCRIPTION OF DRAWINGS

FIG. 4B is a diagram illustrating an example of a functional configuration of the vehicle 20 according to the first embodiment of the present invention;

FIG. 7B is a sequence diagram illustrating an example of processing executed under normal circumstances;

FIG. 8 is a figure illustrating an example of a log obtained by the monitor unit 251 in the sequence of FIG. 7A and FIG. 7B;

FIG. 9A is a sequence diagram illustrating an example of processing executed during an external attack;

FIG. 9B is a sequence diagram illustrating an example of processing executed during an external attack;

FIG. 10 is a figure illustrating an example of a log obtained by the monitor unit 251 in the sequence of FIG. 9A and FIG. 9B;

FIG. 12 is a figure illustrating an example of association information;

FIG. 16 is a figure illustrating an example of a log obtained by the monitor unit 251 in the sequence of FIG. 15;

EMBODIMENTS OF THE INVENTION

Figure 1:
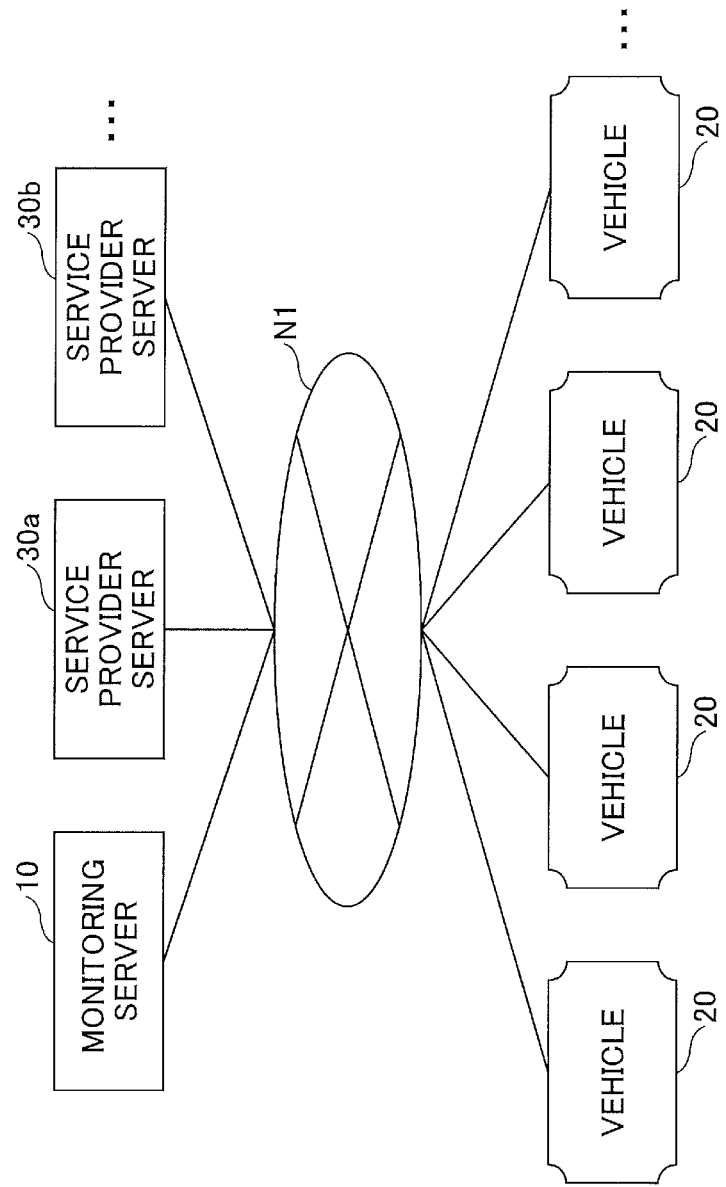
FIG. 1 is a diagram illustrating an example of a system configuration according to an embodiment of the present invention.

Embodiments of the present invention are described below with reference to drawings. FIG. 1 is a diagram illustrating an example of a system configuration according to an embodiment of the present invention. In FIG. 1, multiple vehicles 20 are automobiles (connected cars) connected to various kinds of servers (a monitoring server 10, a service provider server 30a, a service provider server 30b, and the like) via a network N1 such as the Internet. For example, each of the vehicles 20 communicates with various kinds of servers by connecting to the network N1 via a wireless network such as a mobile communication network.

The service provider server 30a, the service provider server 30b, and the like (hereinafter referred to as "service provider servers 30" when they are not distinguished from each other) are one or more computers providing a predetermined service based on information collected from the vehicle 20 or with respect to the vehicle 20. For example, the service provider server 30a may provide telematics services. The service provider server 30b may provide services based on data collected from the vehicles 20.

The monitoring server 10 is one or more computers that detect an occurrence of anomaly in the vehicle 20 and analyze the contents of the anomaly based on the data transmitted (uploaded) from the vehicles 20. An example of an anomaly is a cyber-attack (external attack) via the network against the vehicles 20.

Figure 2:
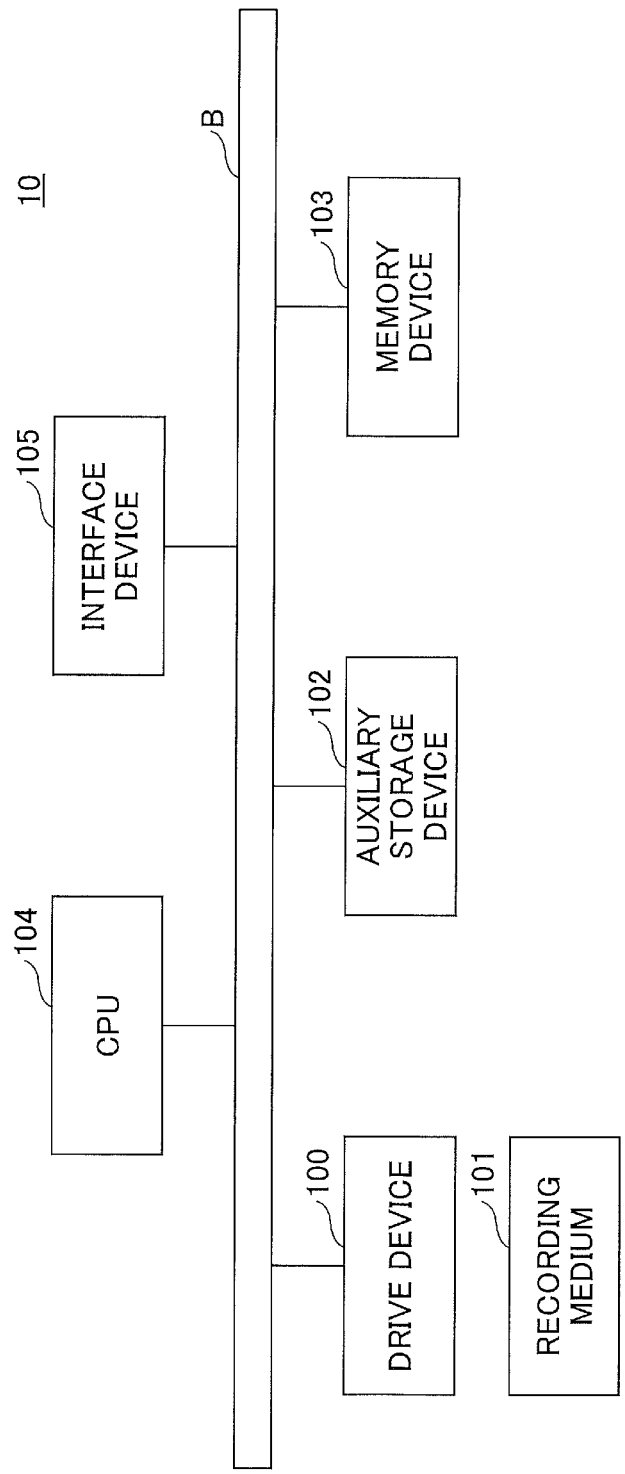
FIG. 2 is a diagram illustrating an example of a hardware configuration of a monitoring server 10 according to the embodiment of the present invention.

FIG. 2 is a diagram illustrating an example of a hardware configuration of the monitoring server 10 according to the embodiment of the present invention. In FIG. 2, the monitoring server 10 includes a drive device 100, an auxiliary storage device 102, a memory device 103, a CPU 104, and an interface device 105, and the like, which are connected with each other via a bus B.

The program that implements processing on the monitoring server 10 is provided as a recording medium 101 such as a CD-ROM. When the recording medium 101 that stores the program is set in the drive device 100, the program is installed in the auxiliary storage device 102 from the recording medium 101 via the drive device 100. However, the program does not necessarily have to be installed from the recording medium 101, and may be downloaded from another computer via the network. The auxiliary storage device 102 stores the installed program and also stores required files, data, and the like.

The memory device 103 reads the program from the auxiliary storage device 102 and stores the program therein when an instruction to start the program is given. The CPU 104 executes the functions of the monitoring server 10 according to the program stored in the memory device 103. The interface device 105 is used as an interface to connect to the network.

Figure 3:
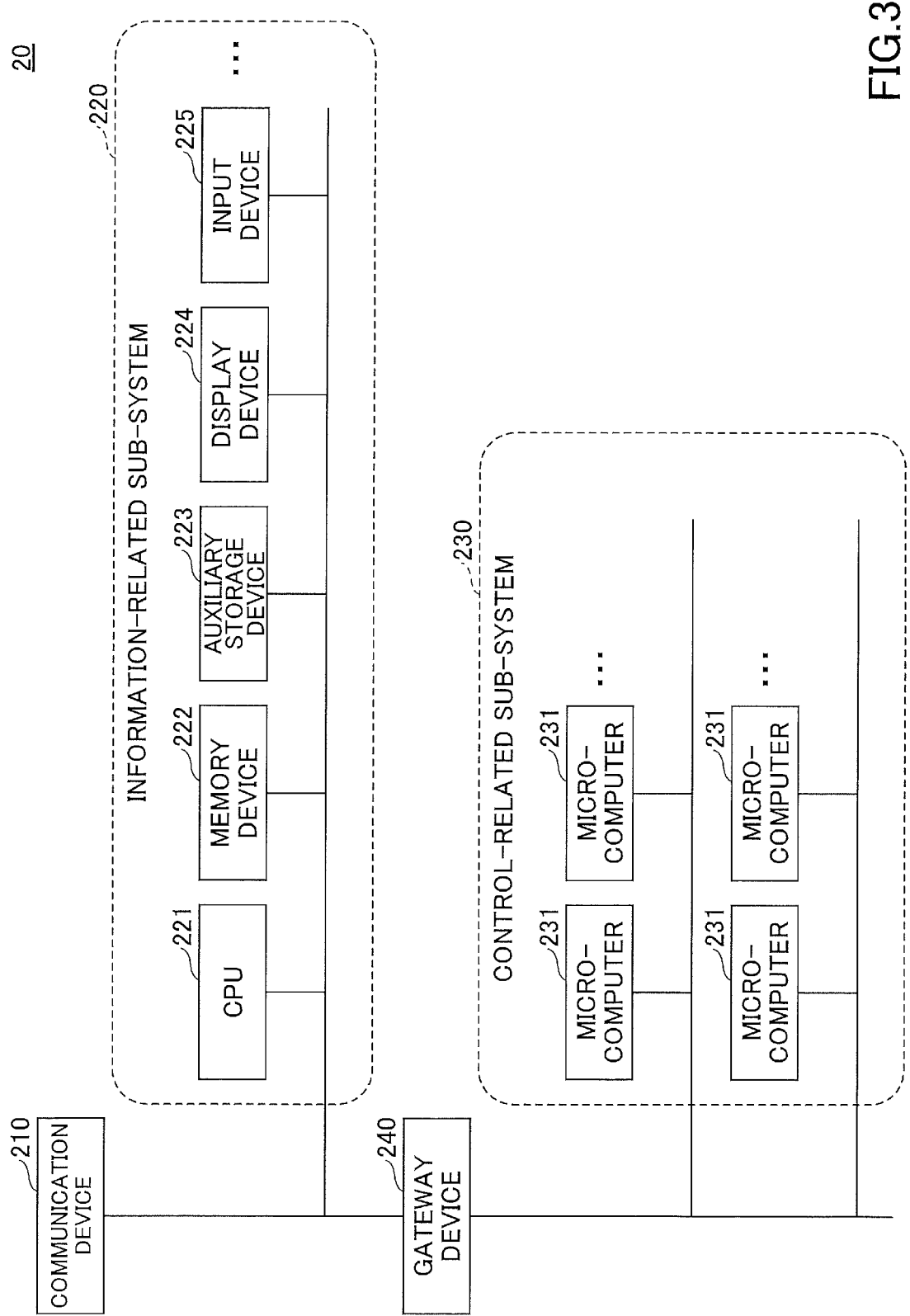
FIG. 3 is a diagram illustrating an example of a hardware configuration of a vehicle 20 according to the embodiment of the present invention.

FIG. 3 is a diagram illustrating an example of a hardware configuration of the vehicle 20 according to the embodiment of the present invention. In FIG. 3, the vehicle 20 includes a communication device 210, an information-related sub-system 220, a control-related sub-system 230, and a gateway device 240, and the like.

The communication device 210 includes a communication module for connecting to the network N1, a communication module for communicating with other vehicles 20 or devices on the road, a communication module for connecting to smartphones and the like via a wireless LAN or a short-range wireless communication, and the like.

The information-related sub-system 220 executes information processing according to the installed program, and includes a CPU 221, a memory device 222, an auxiliary storage device 223, a display device 224, and an input device 225, and the like. The auxiliary storage device 223 stores installed programs and various kinds of data used by the programs, and the memory device 222 reads the program, which is to be started, from the auxiliary storage device 223 and stores the program therein. The CPU 221 executes the functions of the information-related sub-system 220 according to the program stored in the memory device 222. The display device 224 displays a graphical user interface (GUI) and the like with the program. The input device 225 is operation components such as a button or a touch panel, and is used to input various operation instructions. For example, in-vehicle devices such as car navigation systems, head units of vehicle audio, and the like are examples of the information-related sub-system 220.

The control-related sub-system 230 controls the behavior of the vehicle 20, and includes multiple microcomputers 231 and the like for various controls. For example, non-IP protocols such as a controller area network (CAN) are used in the control-related sub-system 230. For example, an electronic control unit (ECU) is an example of the microcomputer 231.

The gateway device 240 is a gateway (for example, central gateway (CGW)) for connecting the information-related sub-system 220 and the control-related sub-system 230. The gateway device 240 relays communication between the network of the information-related sub-system 220 and the network of the control-related sub-system 230. The gateway device 240 may relay only the necessary and sufficient communication (i.e., relay signals) with communication filtering, and in such case, the gateway device 240 separates (isolates) the information-related sub-system 220 and the control-related sub-system 230 in terms of hardware and software.

The hardware configuration illustrated in FIG. 3 is a mere example. The hardware configuration of the vehicle 20 is not specifically limited as long as the functions explained below can be achieved.

First Embodiment

In the first embodiment of the present invention, means for acquiring a log output from a device to be monitored and ascertaining a series of operations for a specified event is explained.

Figure 4A:
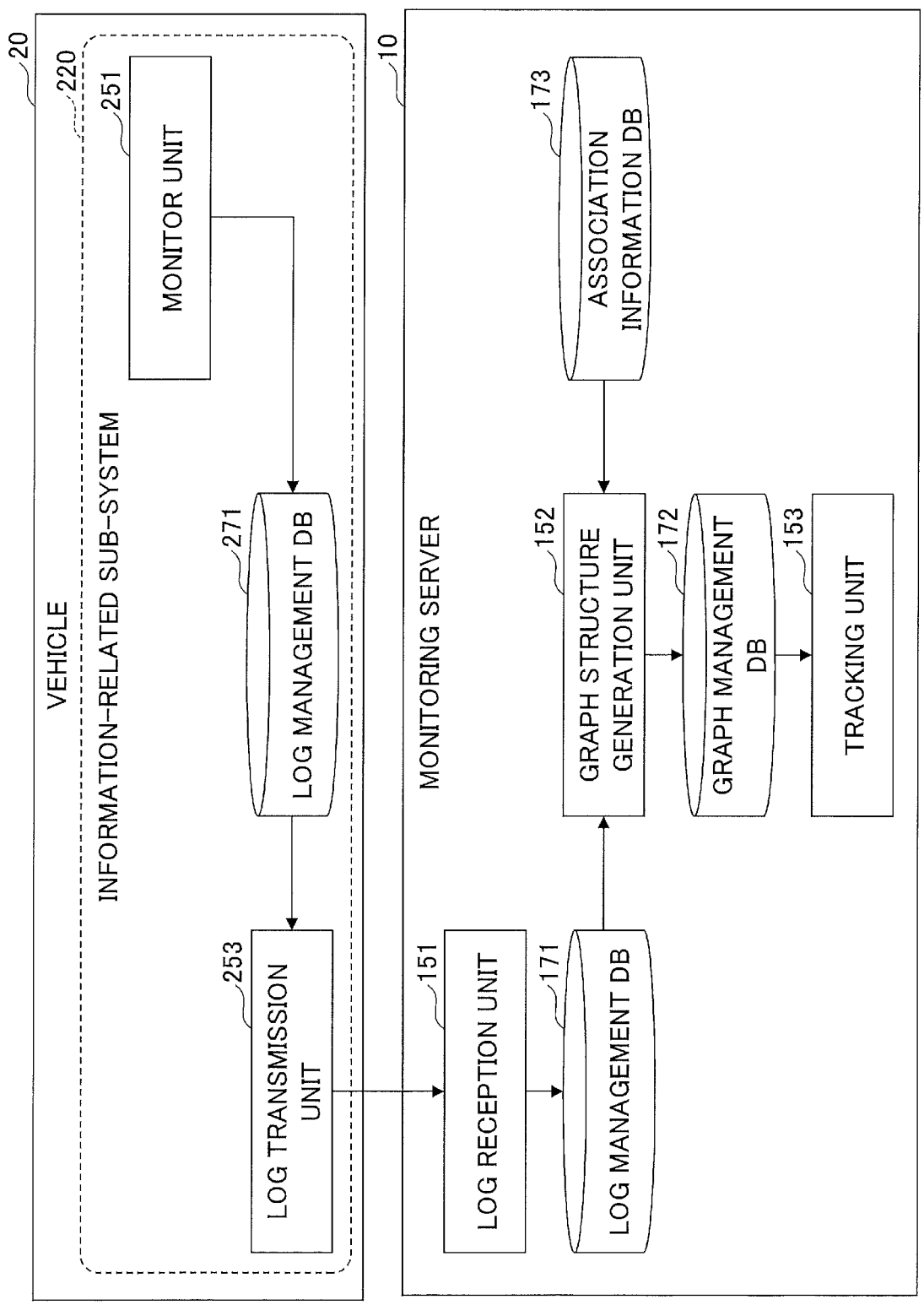
FIG. 4A is a diagram illustrating an example of a functional configuration of a vehicle 20 and a monitoring server 10 according to a first embodiment of the present invention.

FIG. 4A is a diagram illustrating an example of a functional configuration of the vehicle 20 and the monitoring server 10 according to the first embodiment of the present invention. In FIG. 4A, the information-related sub-system 220 of the vehicle 20 includes a monitor unit 251, a log transmission unit 253, and the like. Each of these units is implemented by processing that one or more programs installed in the information-related sub-system 220 causes the CPU 221 to execute. Also, the information-related sub-system 220 includes a database (a storage unit) such as a log management database (DB) 271 and the like. The database (the storage unit) can be implemented with, for example, the memory device 222, the auxiliary storage device 223, or the like, and may be provided in a memory protection area of the memory device 222, the auxiliary storage device 223, or the like.

The monitor unit 251 obtains logs from devices to be monitored (for example, the information-related sub-system 220, the microcomputer 231 of the control-related sub-system 230, the gateway device 240, and the like). For example, the monitor unit 251 may obtain the log with regular intervals or in response to an occurrence of a particular event or the like, or the monitor unit 251 may obtain the log at a point in time when an anomaly detection device (an IDS and the like in the vehicle 20) detects an anomaly, or a point in time when a trigger for executing the monitor unit 251 is manually input or input by another device. For example, at the point in time when the monitor unit 251 obtains the log, the monitor unit 251 obtains the log related to a process executed on the CPU 221 of the information-related sub-system 220, a process executed on the microcomputer 231 of the control-related sub-system 230, and a process executed on the gateway device 240. Depending on the device and the process in the device, the required log may not be output at all times, and accordingly, the monitor unit 251 obtains the log by using a system command or the like. For example, in a case where the device to be monitored is a system based on Linux (registered trademark), the kernel behavior can be obtained with SystemTap. For example, in a case where the device to be monitored is a system based on BSD, activity of the process can be obtained with DTrace. The log includes items such as the device to be monitored, a process executed on the device, an object related to the process, an action executed on the object by the process, and the like. The object is a target to be controlled by the process, and is, for example, a file, a communication address, a process (child process), a device, and the like. The action is an operation on the object. For example, when the object is a file, the action is generation, deletion, change, read, and the like. The monitor unit 251 may collect a log of an application executed by the CPU 221, and process the collected log into the above items.

The log obtained by the monitor unit 251 is stored in the log management DB 271. In the log management DB 271, sign and encryption may be performed for security. In view of a length of time from an occurrence of an external attack to a detection of an anomaly, a log for the required period of time is held in the log management DB 271. In order to save resources in the log management DB 271, an unnecessary part of the log may be deleted from the log management DB 271. For example, when a file of certain firmware is updated in the vehicle 20, logs older than a specified age in the file may be deleted.

When a point in time for transmission to the monitoring server 10 arrives, the log transmission unit 253 transmits the log stored in the log management DB 271 to the monitoring server 10.

The monitoring server 10 includes a log reception unit 151, a graph structure generation unit 152, a tracking unit 153, and the like. Each of these units is implemented by processing that one or more programs installed in the monitoring server 10 causes the CPU 104 to execute. Also, the monitoring server 10 uses databases (storage units) such as a log management DB 171, a graph management DB 172, an association information DB 173, and the like. The databases (the storage units) can be implemented with, for example, the auxiliary storage device 102 or storage devices and the like that can be connected to the monitoring server 10 via the network, and may be provided in a memory protection area of the auxiliary storage device 102 or the storage devices and the like that can be connected via the network.

The log reception unit 151 receives a log transmitted (uploaded) from the vehicle 20, and stores the log in the log management DB 171. In the log management DB 171, sign and encryption may be performed for security. The monitoring server 10 is also configured such that, in view of a length of time from an occurrence of an external attack to a detection of an anomaly, a log for the required period of time is held in the log management DB 171. In order to save resources in the log management DB 171, an unnecessary part of the log may be deleted from the log management DB 171. For example, when a file of certain firmware is updated in the vehicle 20, logs older than a specified age in the file may be deleted.

The graph structure generation unit 152 generates a graph structure showing an association between a process and an object from the log stored in the log management DB 171. For the graph structure, generation algorithms based on graph theory such as directed acyclic graph and bipartite graph can be used. The generated graph structure is stored in the graph management DB 172. In the graph management DB 172, sign and encryption may be performed for security. In order to save resources in the graph management DB 172, the graph structure may be stored in the graph management DB 172 using a succinct data structure such as Level-Order Unary Degree Sequence (LOUDS) and the like. In order to save resources in the graph management DB 172, an unnecessary part of the graph structure may be deleted from the graph management DB 172. For example, when an unnecessary part of a log is deleted from the log management DB 171, the graph structure associated with the deleted part of the log may be deleted from the graph management DB 172.

Depending on the device to be monitored, some of the items in the log are insufficient, and it may be impossible to generate a graph structure. For example, when an object is a file, it may be impossible to identify a device in which a process is associated with the file. Also, it may be impossible to obtain the log itself. For example, even though a CAN communication is performed, it may be impossible to obtain a log of an ECU with which communication is performed. In such case, an association between an object and a process is managed in advance as association information in the association information DB 273. In an example of a file, an association between a file and a process that uses the file is managed in the association information DB 273. In an example of CAN communication, an association between an object concerning CAN communication and a process of an ECU with which the CAN communication is performed is managed in the association information DB 273. The graph structure generation unit 152 uses the association information stored in the association information DB 273 to complement an association of the graph structure.

The tracking unit 153 uses the graph structure stored in the graph management DB 172 to identify a process related to a specified object and the like, and further identifies an object related to the identified process. A point in time when the tracking unit 153 identifies a process and an object may be a point in time when the anomaly detection device (an IDS and the like in the vehicle 20) detects an anomaly or a point in time when a trigger for executing the tracking unit 153 is manually input or input by another device. For example, when the IDS in the vehicle 20 detects an anomaly in a certain microcomputer 231, the tracking unit 153 identifies an anomalous process related to the microcomputer 231, and further identifies an object related to the identified anomalous process. Note that in order to identify a suspicious process and object even when an anomaly is not detected, a trigger for execution manually input or input by another device may be given at a point in time different from the detection of anomaly. In this manner, the tracking unit 153 can identify a process and an object related to a specified event (including detection of an anomaly, suspicion of an external attack, and the like), and can exclude a process and an object not related to the specified event, so that an affected range of the specified event can be identified. In addition, information for searching a pathway up to the occurrence of the specified event can be provided.

FIG. 4A illustrates an example in which the monitoring server 10 includes units such as the graph structure generation unit 152, the tracking unit 153, and the like. Alternatively, some or all of these functional units may be included in the vehicle 20.

FIG. 4B is a diagram illustrating an example of a functional configuration of the vehicle 20 according to the first embodiment of the present invention. In FIG. 4B, the units, i.e., the graph structure generation unit 254 and the tracking unit 255, are included in the vehicle 20, and the databases, i.e., the graph management DB 272 and the association information DB 273, are included in the vehicle 20. Processing executed by the graph structure generation unit 254 and the tracking unit 255 is the same as in the graph structure generation unit 152 and the tracking unit 153 of FIG. 4A. Note that the graph structure generation unit may be configured to be included in the vehicle 20, and the tracking unit may be configured to be included in the monitoring server 10. Also, the monitor unit may be included in the monitoring server 10.

Second Embodiment

In the second embodiment of the present invention, means for determining an external attack is explained.

Figure 5A:
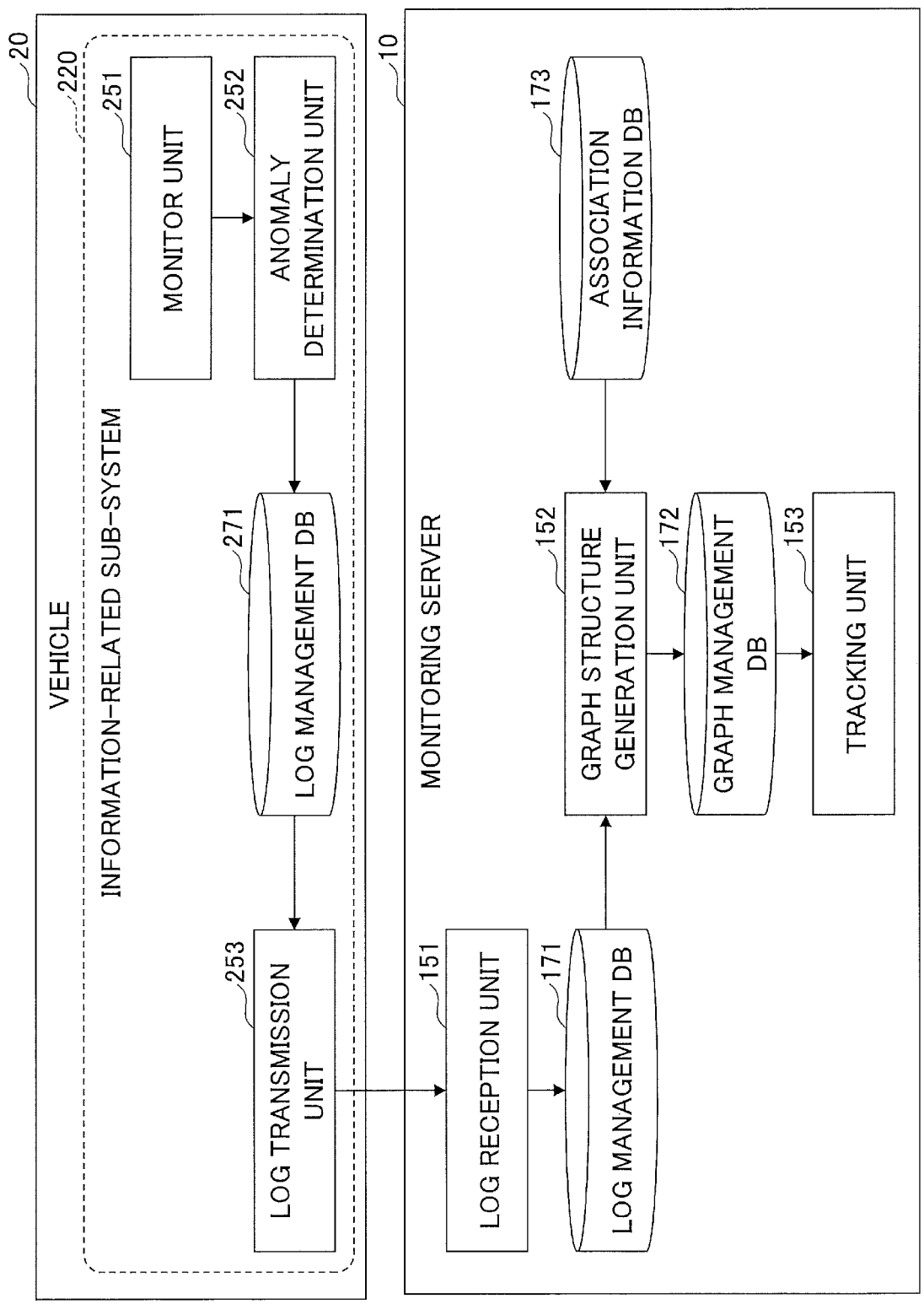
FIG. 5A is a diagram illustrating an example of a functional configuration of a vehicle 20 and a monitoring server 10 according to a second embodiment of the present invention.

FIG. 5A is a diagram illustrating an example of a functional configuration of a vehicle 20 and a monitoring server 10 according to the second embodiment of the present invention. In FIG. 5A, the information-related sub-system 220 of the vehicle 20 includes an anomaly determination unit 252 in addition to the monitor unit 251 and the log transmission unit 253 as illustrated in FIG. 4A. The anomaly determination unit 252 may be implemented with the IDS and the like of the vehicle 20. The anomaly determination unit 252 is also implemented by processing that one or more programs installed in the information-related sub-system 220 causes the CPU 221 to execute.

Processing of the monitor unit 251 and the log transmission unit 253 in the vehicle 20 is the same as the processing of the monitor unit 251 and the log transmission unit 253 according to the first embodiment.

The anomaly determination unit 252 determines whether an anomaly exists on the basis of a log obtained by the monitor unit 251. For example, whether an anomaly exists or not may be determined on the basis of a communication interval between microcomputers 231 or data values that are output from a microcomputer 231. For example, whether an anomaly exists may be determined by inputting a log obtained by the monitor unit 251 into a trained model (for example, a neural network) that inputs a log and outputs a degree of anomaly.

Processing of the log reception unit 151 and the graph structure generation unit 152 of the monitoring server 10 is the same as the processing of the log reception unit 151 and the graph structure generation unit 152 according to the first embodiment.

The tracking unit 153 uses the graph structure stored in the graph management DB 172 to identify a process related to a specified object and the like, and further identify an object related to the identified process. For example, when the IDS in the vehicle 20, the anomaly determination unit 252, and the like detect an anomaly in a certain microcomputer 231, the tracking unit 153 identifies an anomalous process related to the microcomputer 231, and further identifies an object related to the identified anomalous process. In this manner, the tracking unit 153 can identify a process and an object related to the anomaly, and can exclude a process and an object not related to the anomaly, so that an affected range of the anomaly can be identified. In addition, information for searching a pathway up to the occurrence of the anomaly can be provided.

In the detection of anomaly, not only an external attack but also a malfunction may be detected as an anomaly. With the use of an empirical rule that most external attacks have an external source point and most malfunctions have no external source point, the tracking unit 153 may determine that there is a possibility of an external attack when an external source point is found by tracking the graph structure, i.e., the communication device 210 is involved to connect to the outside of the vehicle 20. However, when an anomaly is detected due to an access to the communication device 210 by a car dealer, it is to be determined that there is not a possibility of an external attack, and therefore, the tracking unit 153 may determine a possibility of an external attack by referring to a black list or a white list configured in advance with regard to the communication address of the external source point.

The tracking unit 153 detects an occurrence of an external attack by comparing a graph structure under normal circumstances that was generated in an environment in which there is no external attack and a graph structure that was generated in an environment in which there is an external attack. Also, the tracking unit 153 may refer to a reference graph structure during malfunction or under normal circumstances in which there is no external attack, and when there occurs a pathway that could not occur in the reference graph structure, the tracking unit 153 may determine that there is a possibility of an external attack. Also, the tracking unit 153 may make comparison with a reference graph structure representing a pathway specified by the specification, and when there occurs a pathway that could not occur in the reference graph structure, the tracking unit 153 may determine that there is a possibility of an external attack. Also, the tracking unit 153 may make comparison with a reference graph structure representing a pathway that should not occur due to reasons of the specification or security, and when there occurs a pathway that matches with the reference graph structure, the tracking unit 153 may determine that there is a possibility of an external attack.

FIG. 5A illustrates an example in which the vehicle 20 includes the anomaly determination unit 252. Alternatively, the anomaly determination unit 252 may be included in the monitoring server 10.

Third Embodiment

In the third embodiment of the present invention, means for preventing damage caused by external attacks and the like in view of safety in the vehicle 20 and the like is explained.

Figure 5B:
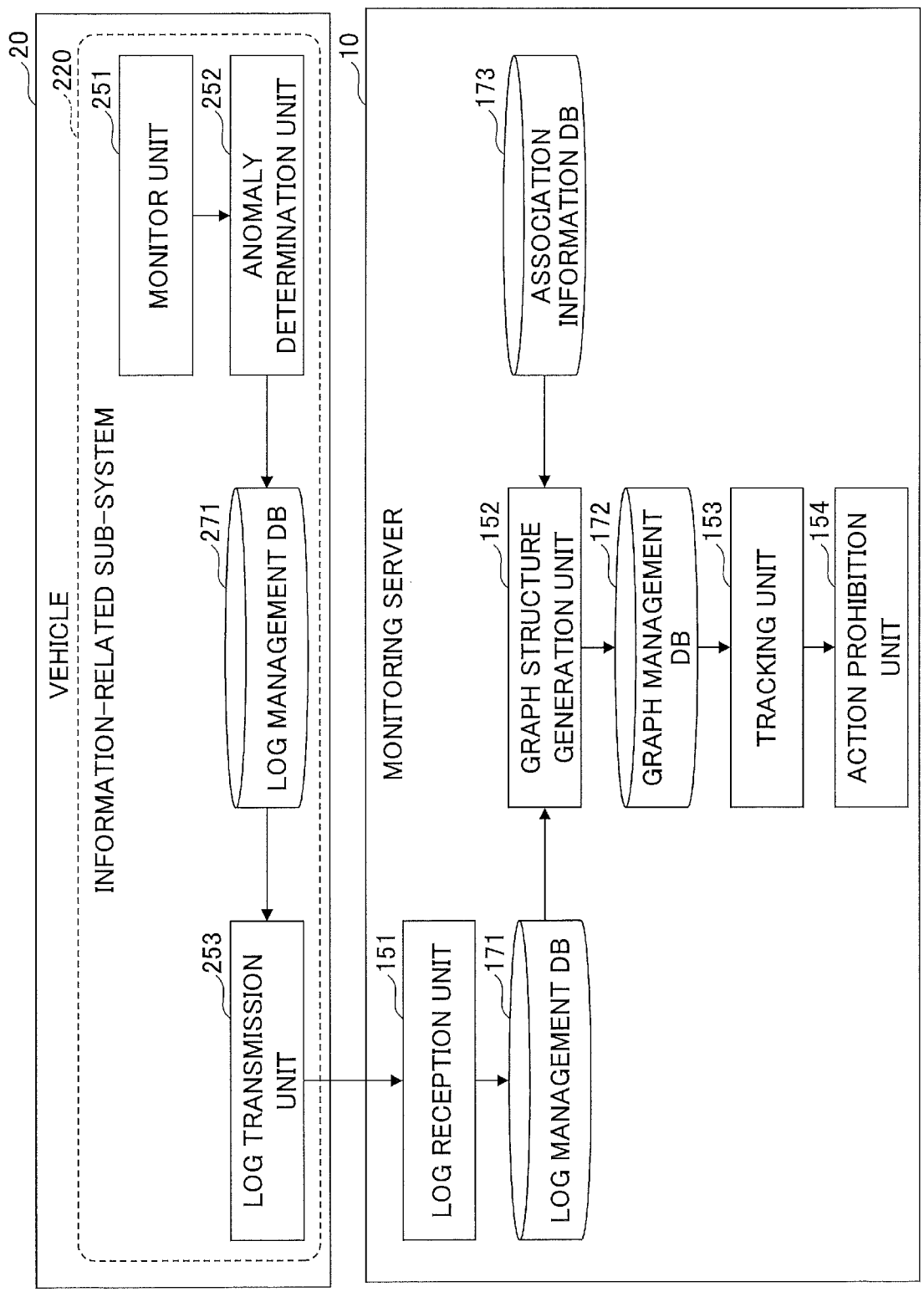
FIG. 5B is a diagram illustrating an example of a functional configuration of a vehicle 20 and a monitoring server 10 according to a third embodiment of the present invention.

FIG. 5B is a diagram illustrating an example of a functional configuration of a vehicle 20 and a monitoring server 10 according to the third embodiment of the present invention. In FIG. 5B, the monitoring server 10 includes an action prohibition unit 154 in addition to the log reception unit 151, the graph structure generation unit 152, and the tracking unit 153 as illustrated in FIG. 5A. The action prohibition unit 154 is also implemented by processing that one or more programs installed in the monitoring server 10 causes the CPU 104 to execute.

Processing of the monitor unit 251, the anomaly determination unit 252, and the log transmission unit 253 of the vehicle 20 is the same as the processing of the monitor unit 251, the anomaly determination unit 252, and the log transmission unit 253 according to the second embodiment.

Processing of the log reception unit 151, the graph structure generation unit 152, and the tracking unit 153 of the monitoring server 10 is the same as the processing of the log reception unit 151, the graph structure generation unit 152, and the tracking unit 153 according to the second embodiment.

The action prohibition unit 154 prohibits actions on objects in the affected range identified by the tracking unit 153 to prevent the spread of damage caused by anomalies. For example, in a case of a Linux-based system, the action prohibition unit 154 can control access to objects by using AppArmor.

FIG. 5B illustrates an example in which the monitoring server 10 includes the action prohibition unit 154. Alternatively, the action prohibition unit 154 may be included in the vehicle 20.

(Concrete Example)

Figure 6:
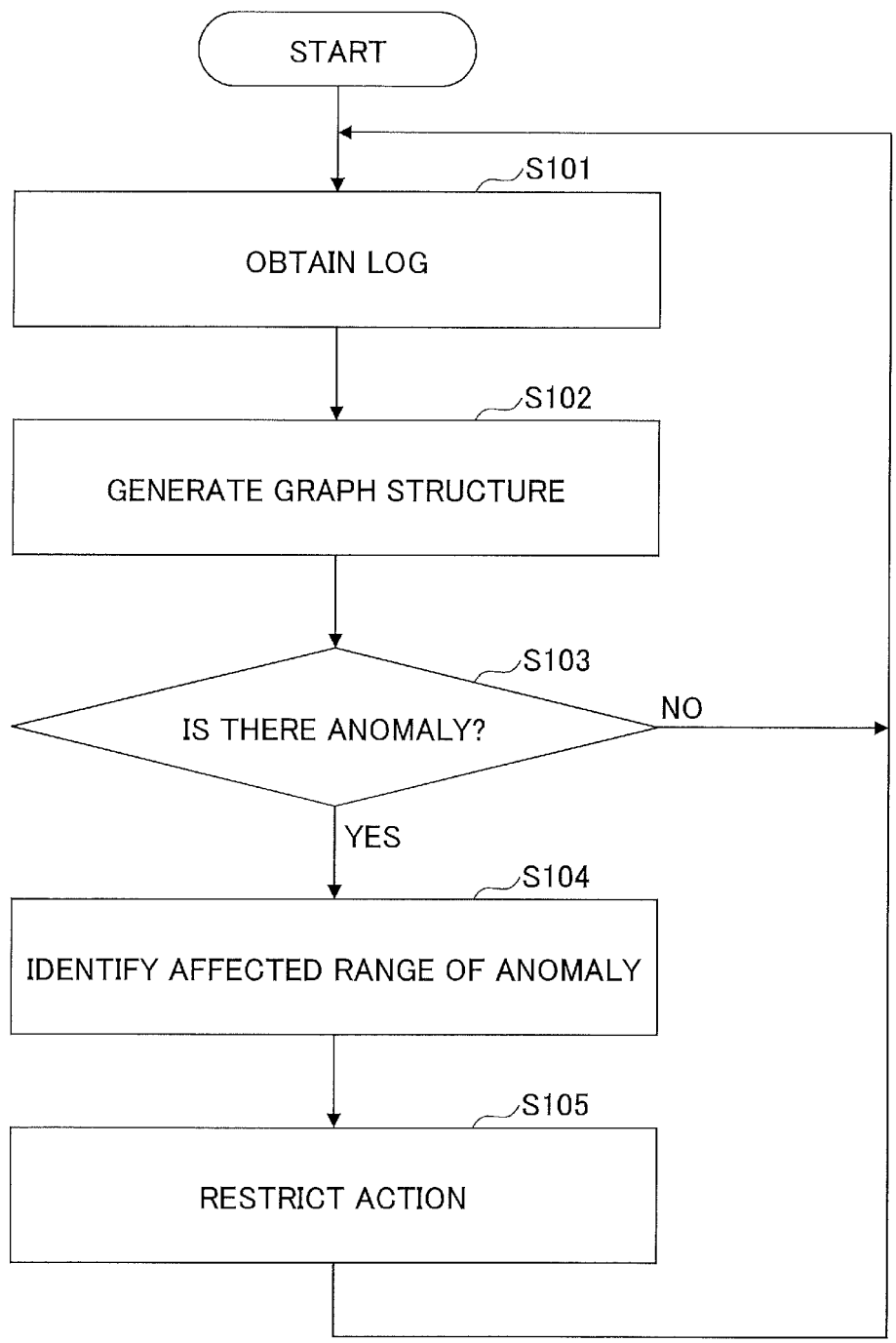
FIG. 6 is a flowchart for explaining an example of a processing procedure when a log occurs.

Hereinafter, in the example of the functional configuration as illustrated in FIG. 5B, a processing procedure executed by the information-related sub-system 220 of the vehicle 20 and the monitoring server 10 is explained. FIG. 6 is a flowchart for explaining an example of a processing procedure when a log occurs.

First, the monitor unit 251 of the vehicle 20 obtains a log that is output by the device to be monitored (S101). For example, the monitor unit 251 obtains the log by using SystemTap of Linux, DTrace of BSD and the like, with regular intervals or in response to an occurrence of a particular event or the like. Depending on the device to be monitored, the point in time when the log is obtained may be different.

A concrete example in which the monitor unit 251 obtains a log in response to processing executed in the vehicle 20 is explained.

Figure 7A:
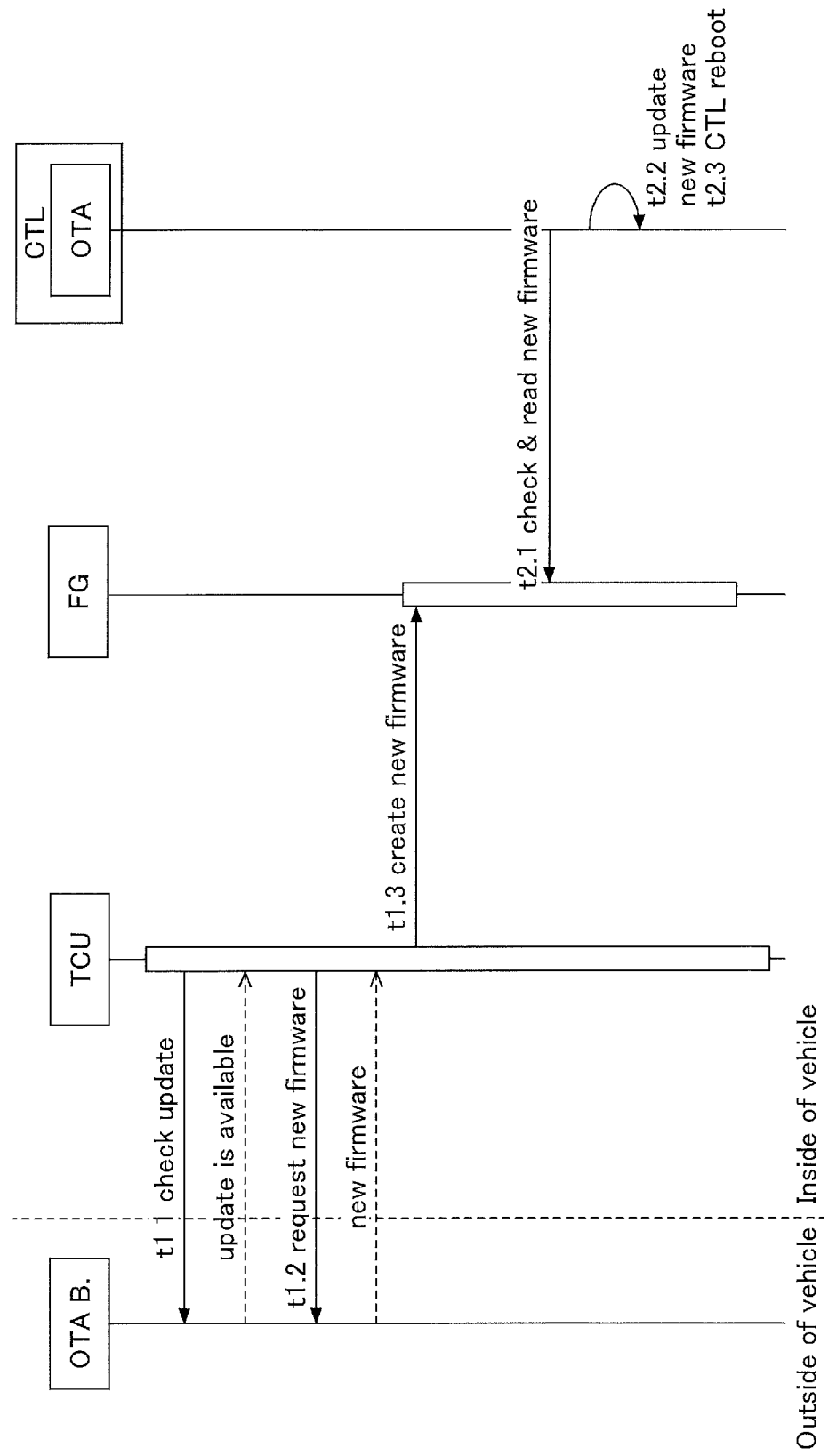
FIG. 7A is a sequence diagram illustrating an example of processing executed under normal circumstances.

FIG. 7A and FIG. 7B are sequence diagrams illustrating an example of processing executed under normal circumstances. In FIG. 7A and FIG. 7B, an OTA B. (Over The Air Backend) is one of the service provider servers 30 outside the vehicle, and has the function of providing update software for the vehicle 20. A TCU (Telematics Control Unit) is a functional unit of the information-related sub-system 220, and has a function for communicating with the service provider server 30. An FG (Flashing Gateway) is a functional unit of the information-related sub-system 220 or the control-related sub-system 230, and has a function for temporarily storing software received from the OTA B. A CTL (Controller) corresponds to the gateway device 240, and has a function (OTA) for updating the software received from the OTA B. A UI (User Interface) is an instrument panel and the like, and corresponds to the display device 224 and the input device 225 of the information-related sub-system 220. An ECU 2 corresponds to the microcomputer 231. It is assumed that a log cannot be obtained from the ECU 2. During CAN communication in the control-related sub-system 230, the CTL is assumed to use CAN-ID1, and the ECU 2 is assumed to use CAN-ID2.

With regular intervals or in response to an occurrence of a particular event or the like, the TCU refers to the OTA B. to check whether there is firmware to be updated in the vehicle 20 (t1.1). When there is firmware to be updated, the TCU requests the OTA B. for an update file of new firmware (t1.2). When the TCU receives the update file, the update file is stored in the FG (t1.3).

With regular intervals or in response to an occurrence of a particular event or the like, the CTL refers to the FG to check whether there is firmware to be updated in the CTL, and when there is firmware to be updated, the CTL obtains the update file of the new firmware from the FG (t2.1). The CTL updates the firmware of the CTL by using the update file (t2.2), and restarts the CTL to enable the updated firmware (t2.3).

When the UI receives an operation instruction with respect to the ECU 2 from the driver and the like, the UI transmits a message indicating the operation instruction to the CTL (t3.1). The CTL attaches CAN-ID1 to the message transmitted from the TCU and relays the message to the ECU 2 (t3.2). The ECU 2 confirms CAN-ID1, i.e., the ID of the CTL attached to the message, and operates according to the received message.

The download of the update file at t1.1 to t1.3, the update of the firmware at t2.1 to t2.3, and the operation on the ECU 2 at t3.1 to t3.2 are performed at different points in time, and are chronologically discontinuous.

FIG. 8 is a figure illustrating an example of a log obtained by the monitor unit 251 in the sequence of FIG. 7A and FIG. 7B. The monitor unit 251 executes SystemTap of Linux, DTrace of BSD, and the like on devices, i.e., the TCU, the CTL, and the UI, and obtains a log including a date and time, a device, a process, an SRC, a DST, and an action. The date and time is a date and time when the process is executed in the device. The device is a device to be monitored. The process is a process executed in the device to be monitored. The SRC is an object at the source of control performed by the process. The DST is an object at the destination of control performed by the process. The action is an operation performed on the object.

The first line of the log in FIG. 8 corresponds to t1.1 of FIG. 7A. At the date and time of t1.1, a record of log is obtained with regard to an action (http://ota_ip/info) that a process of the TCU (tcu pid1) executes from a transmission source address (IP:ip1:port1) to a destination address (IP: ota_ip:80) to check whether there is firmware to be updated. Likewise, at the date and time of t1.2, a record of log is obtained with regard to an action that the TCU executes to request an update file, and at the date and time of t1.3, a record of log is obtained with regard to an action that the TCU executes to store the update file to the FG. "—" is an item that can not be obtained in the log.

The fourth line of the log in FIG. 8 corresponds to t2.1 in FIG. 7A. At the date and time of t2.1, a record of log is obtained with regard to an action (file:read) that the CTL executes with a process of the OTA function (ota pid1) to obtain the update file of the new firmware from the provider of the update file (FG: FirmwareCTL). Likewise, at the date and time of t2.2, a record of log is obtained with regard to an action that the CTL executes to update the firmware, and at the date and time of t2.3, a record of log is obtained with regard to an action that the CTL executes to terminate the process of the CTL and a record of log is obtained with regard to an action that the CTL executes to start the process of the CTL.

The eighth line of the log in FIG. 8 corresponds to t3.1 in FIG. 7B. At the date and time of t3.1, a record of log is obtained with regard to an action (CAN) that the UI executes with a process of the UI (ui pid1) to transmit a message of CAN communication to the CTL (CAN:ID1) that performs control. Likewise, at the date and time of t3.2, a record of log is obtained with regard to an action that the CTL executes to transmit a message to the ECU 2.

FIG. 9A and FIG. 9B are sequence diagrams illustrating an example of processing executed during an external attack. FIG. 9A and FIG. 9B are sequence diagrams of a case of malware infection, and a Mal CTL represents the gateway device 240 infected with the malware. A C&C (Command and Control) is a server that carries out malicious operation.

A browser of the TCU accesses a spoofed site disguised as, for example, a hotspot and the like of a car dealer, a distributor, or a gas station (t1.1). As a result of access to the spoofed site, the attack script is transmitted to the TCU. The attack script exploits the vulnerability of the TCU to tamper the browser so that the browser can be caused to execute an arbitrary code. The browser requests the spoofed site for malware (t1.2). When the TCU receives the malware, the TCU saves the malware (t1.3), and executes the malware (t1.4). The malware exploits the vulnerability of the TCU to disable the security function to elevate the privilege of the malware. The malware requests a tampered file of firmware of the CTL (t1.5), and when the tampered file is received, the tampered file is stored to the FG (t1.6).

With regular intervals or in response to an occurrence of a particular event or the like, the CTL refers to the FG to check whether there is firmware to be updated in the CTL, and when there is firmware to be updated, the CTL obtains the update file of the new firmware from the FG (t2.1). In this case, a tampered file is obtained. The CTL updates the firmware of the CTL by using the tampered file (t2.2), and reboots the CTL to enable the updated firmware (t2.3). As a result, the CTL is infected with the malware, and the CTL is tampered so that an arbitrary ID can be attached to a message from the CTL.

The malware in the TCU requests the C&C for a malicious command (t3.1), and receives a malicious command from the C&C. The TCU transmits a message indicating an operation instruction included in the malicious command to the Mal CTL (t3.2). The Mal CTL is tampered so that an arbitrary ID can be attached to a message, and accordingly, the Mal CTL attaches CAN-ID2, i.e., a malicious ID, to the message. The Mal CTL attaches CAN-ID2 to the message from the malware on the TCU so as to spoof the message as being addressed to the ECU 2 and relays the message (t3.3). The ECU 2 checks CAN-ID2, i.e., the ID attached to the message, and performs an operation according to the received message. In this case, the IDS is assumed to detect anomaly based on reasons such as the transmission of the message at t3.3 being out of a normal point in time.

The download of the tampered file at t1.1 to t1.6, the update of the firmware at t2.1 to t2.3, and the operation on the ECU 2 at t3.1 to t3.3 are carried out at different points in time, and are chronologically discontinuous.

FIG. 10 is a figure illustrating an example of a log obtained by the monitor unit 251 in the sequence of FIG. 9A and FIG. 9B. The monitor unit 251 obtains the log in a manner similar to FIG. 8.

The first line of the log in FIG. 10 corresponds to t1.1 of FIG. 9A. At the date and time of t1.1, a record of log is obtained with regard to an action (http://ip2/info) that the TCU executes with a process of the browser (browser pid1) to perform access from a transmission source address (IP: ip1:port1) to a destination address (IP:ip2:80). Likewise, at the date and time of t1.2, a record of log is obtained with regard to an action that the TCU executes to request malware; at the date and time of t1.3, a record of log is obtained with regard to an action that the TCU executes to store malware; at the date and time of t1.4, a record of log is obtained with regard to an action that the TCU executes to execute malware; at the date and time of t1.5, a record of log is obtained with regard to an action that the TCU executes to request a tampered file; and at the date and time of t1.6, a record of log is obtained with regard to an action that the TCU executes to store the tampered file to the FG.

The seventh line of the log in FIG. 10 corresponds to t2.1 of FIG. 9A. At the date and time of t2.1, a record of log is obtained with regard to an action (file:read) that the CTL executes with a process of the OTA function (ota pid3) to obtain the update file of the new firmware from the provider of the update file (FG: FirmwareCTL). Likewise, at the date and time of t2.2, a record of log is obtained with regard to an action that the CTL executes to update the firmware, and at the date and time of t2.3, a record of log is obtained with regard to an action that the CTL executes to terminate the process of the CTL and a record of log is obtained with regard to an action that the CTL executes to start the process of the CTL.

The eleventh line of the log in FIG. 10 corresponds to t3.1 in FIG. 9B. At the date and time of t3.1, a record of log is obtained with regard to an action (https://ip3/command) that the TCU executes with a process of the malware (malware pid2) to request a malicious command from a transmission source address (IP:ip1:port4) to a destination address (IP: ip3:443). Likewise, at the date and time of t3.2, a record of log is obtained with regard to an action that the TCU executes to transmit an operation instruction to the CTL, and at the date and time of t3.3, a record of log is obtained with regard to an action that the CTL executes to transmit a message to the ECU 2.

In addition to anomaly detection with the IDS, the anomaly determination unit 252 can detect anomaly by checking the log. A known technique can be used to detect anomaly. For example, the anomaly determination unit 252 determines that there is anomaly when there is an action from an SRC to a DST that could not exist or when a DST is not ready to execute an action. For example, the anomaly determination unit 252 checks dates and times in the log, and the anomaly determination unit 252 determines an action executed at an anomalous point in time as anomaly.

The log is stored in the log management DB 271, and the log transmission unit 253 transmits the log stored in the log management DB 271 to the monitoring server 10. A flag indicating anomaly may be attached to a record of log at the date and time of t3.3 at the point in time when anomaly is detected. Alternatively, the anomaly may be notified to the monitoring server 10 at a point in time different from the log.

The log reception unit 151 receives the log, and stores the log in the log management DB 171. At the date and time of t3.3, detection of anomaly of the message attached with CAN-ID2 is also stored in the log management DB 171.

The graph structure generation unit 152 detects records of the log having close dates and times from among the records of the log stored in the log management DB 171, and generates a graph structure indicating an association between processes and objects (S102). For example, the association between processes and objects can be expressed as a bipartite graph and the like from the log illustrated in FIG. 10.

Figure 11:
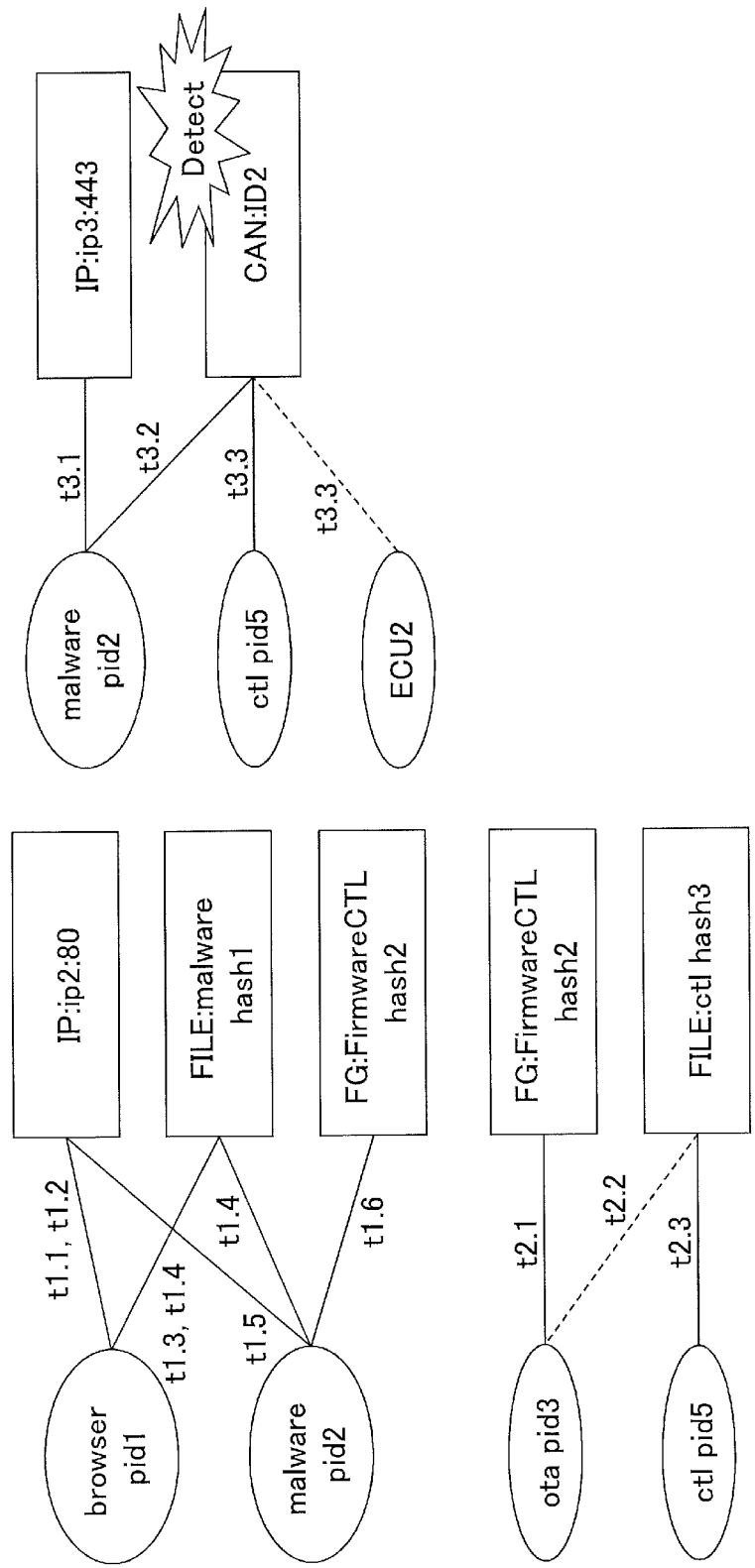
FIG. 11 is a drawing illustrating an example of a graph structure.

FIG. 11 is a drawing illustrating an example of a graph structure. As a general rule, the graph structure generation unit 152 associates a DST as an object with a process to generate a bipartite graph. The graph structure generation unit 152 generates a graph structure indicating an association between a process of the browser (browser pid1) and an object indicating an address of a spoofed site (IP:ip2:80) from the record of log at the date and time of t1.1 of FIG. 10. Like t1.1, the graph structure generation unit 152 generates graph structures from records of the log at the dates and times of t1.2 to t1.6. However, in the case of the action (proc:fork-exec) at the date and time of t1.4, a DST (malware pid2) is also treated as a process, and an SRC (FILE: malware hash1) is treated as an object, so that the object of SRC is associated with two processes (browser pid1 and malware pid2).

Further, the graph structure generation unit 152 generates graph structures from records of the log at the dates and times of t2.1 to t2.3. However, in the case of the records of the log at the date and time of t2.2, the graph structure generation unit 152 cannot obtain information about an update file of firmware from the log. In this manner, to be prepared for the case where it is impossible to obtain sufficient records of the log, records of which the association between objects and processes are known are managed in advance in the association information DB 273.

FIG. 12 is a figure illustrating an example of association information. The association information managed in the association information DB 273 is associations between objects and processes known in advance. For example, the update file of the firmware of the CTL is related to the process of the CTL, and accordingly, the association between the object of FG:FirmwareCTL and the process of the CTL is stored in the association information DB 273. Likewise, the object of the FILE:ct1 is related to the process of the OTA function of the CTL, and accordingly, this association is stored in the association DB 273. For example, CAN-IDs used for the CAN communication by devices such as the CTL and the ECU are known in advance, and in the case of this example, the CTL uses CAN:ID1, and the ECU 2 uses CAN:ID2. Accordingly, the association between the object of CAN:ID1 and the process of the CTL is stored in the association information DB 273, and the association between the object of CAN:ID2 and the process of the ECU 2 is stored in the association information DB 273. Note that the log of the ECU 2 cannot be obtained, and therefore, instead of the process of the ECU 2, the device name of the ECU 2 may be stored in the association information DB 273.

In the case of the action (proc:update) at the date and time of t2.2, the graph structure generation unit 152 uses the association information of the association information DB 273 instead of using the log to associate the process of ota pid3 with the object of FILE:ct1. In the case of the action (proc:start) at the date and time of t2.3, the graph structure generation unit 152 associates the process of the CTL (ct1 pid5) with the object of the SRC (FILE:ct1 hash3). In this manner, depending on the action of the record of the log, the graph structure generation unit 152 may use the association information DB 273 to associate processes and objects, and associate an SRC as an object with a process.

Further, the graph structure generation unit 152 generates graph structures from records of the log at the dates and times of t3.1 to t3.3. At the date and time of t3.3, the graph structure generation unit 152 uses the association information of the association information DB 273 to associate the object of the SRC (CAN:ID2) with the process of the ECU 2. In this manner, when there are objects and processes that can be associated using the association information in the association information DB 273, the graph structure generation unit 152 uses the association information to complement the graph structure.

The bipartite graph as illustrated in FIG. 11 is generated from records of the log at the dates and times of t1.1 to t3.3. A vertex of the bipartite graph is a process or an object, and an edge is an association between a process and an object. In FIG. 11, an association of a solid line is generated based on the log, and an association of a broken line is generated based on the association information in the association information DB 273. The generated bipartite graph is stored in the graph management DB 172.

In addition to graphs generated from the actual log, graph structures representing pathways that should not occur due to reasons of the specification or security may be registered as a deny list to the graph management DB 172, and graph structures representing pathways specified by the specification may be registered as an allow list to the graph management DB 172.

When the tracking unit 153 detects an anomaly of a certain object (S103: Yes), the tracking unit 153 joins graph structures stored in the graph management DB 172, and identifies an anomalous process related to the object in which the anomaly is detected. Further, the tracking unit 153 identifies an object related to the identified anomalous process (S104).

For example, when an anomaly of a message attached with CAN-ID2 is detected, the tracking unit 153 extracts a graph having CAN:ID2 as a vertex from the graph management DB 172, and further extracts graphs having vertices of the extracted graph (i.e., malware pid2, ct1 pid 5, and the ECU 2). According to a similar procedure, graphs connected directly or indirectly to CAN:ID2 are extracted, and the extracted graphs are joined.

Figure 13:
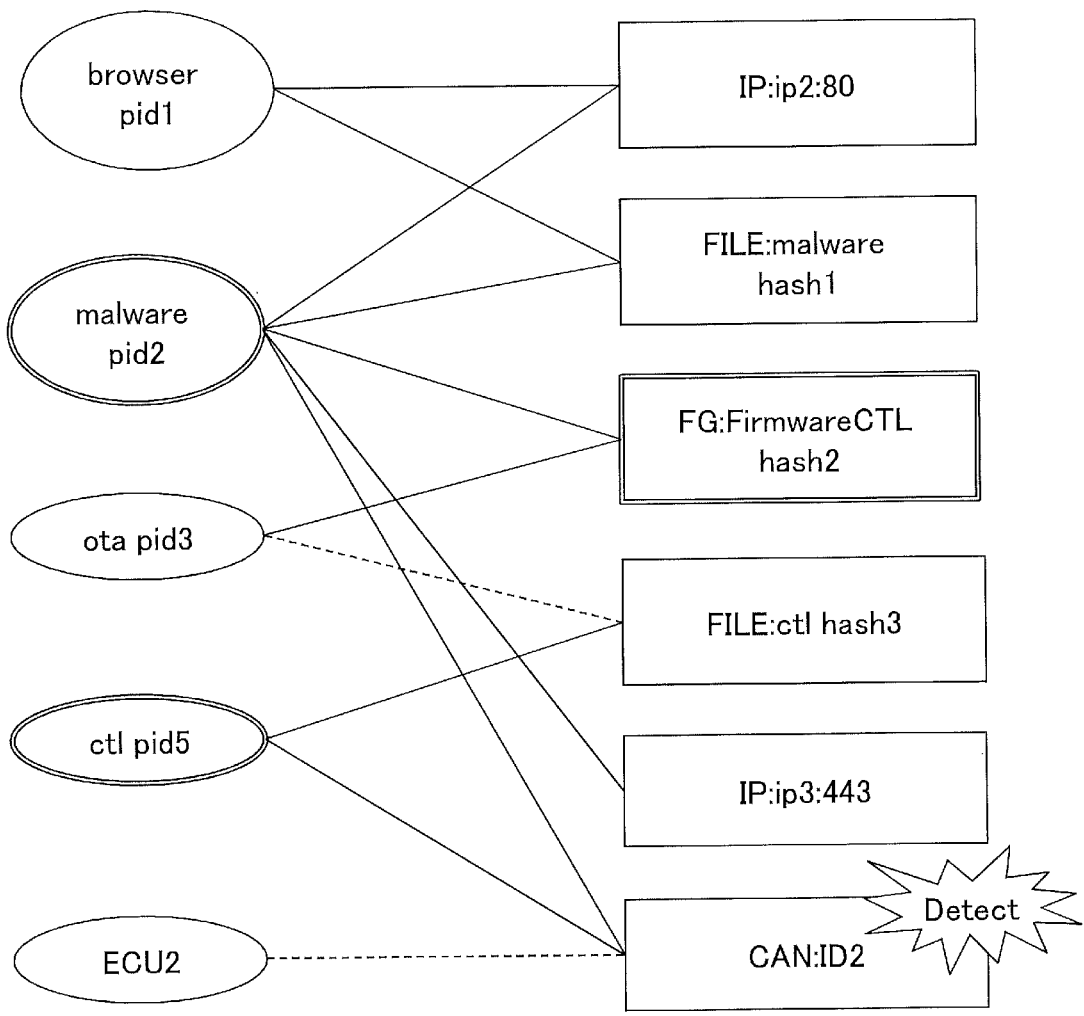
FIG. 13 is a diagram illustrating an example of joining of graph structures.

FIG. 13 is a diagram illustrating an example of joining of graph structures. As illustrated in FIG. 11, there are two bipartite graphs in which the process (malware pid2) related to the object (CAN:ID2), in which an anomaly has been detected, is a vertex. These two bipartite graphs are joined. Likewise, two bipartite graphs in which the process (ct1 pid5) related to the object (CAN:ID2), in which an anomaly has been detected, is a vertex are joined. As a result, it can be identified from FIG. 13 that the affected range of the object (CAN:ID2), in which an anomaly has been detected, includes five processes (processes of browser pid1, malware pid2, ota pid3, ct1 pid5, and ECU 2) and six objects (IP:ip2:80, FILE:malware hash1, FG:FirmwareCTL hash2, FILE:ct1 hash3, IP:ip3:443, and CAN:ID2).

Even when the tracking unit 153 does not detect an anomaly, the tracking unit 153 can detect an anomaly by comparing a graph structure under normal circumstances and a graph structure during an external attack. The tracking unit 153 may detect an anomaly by making comparison with a graph structure registered as a deny list or an allow list in the graph management DB 172.

Figure 14A:
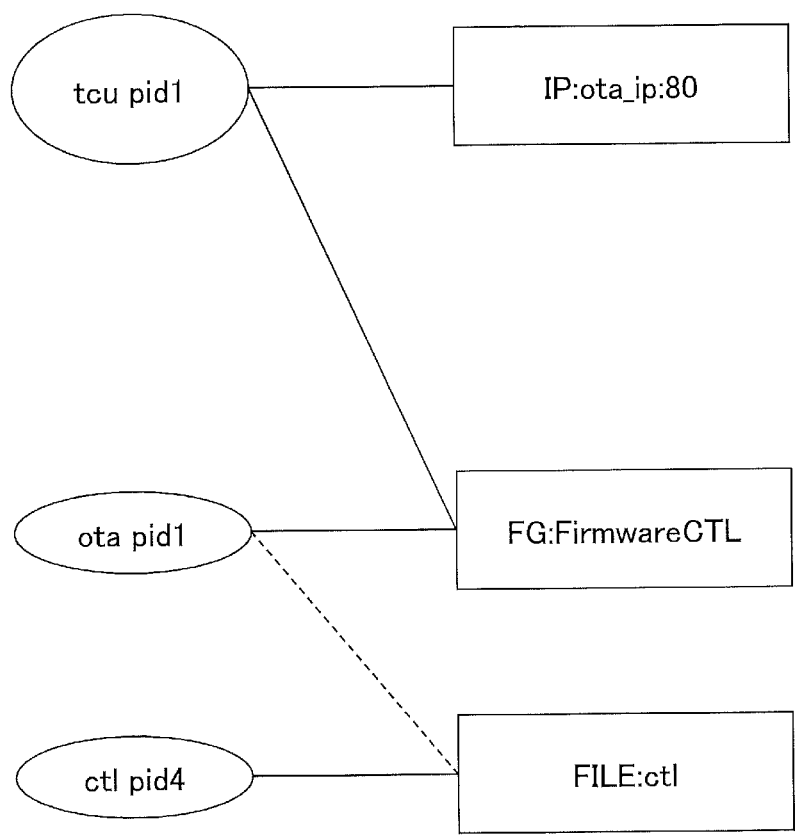
FIG. 14A is a figure illustrating a graph structure under normal circumstances.
Figure 14B:
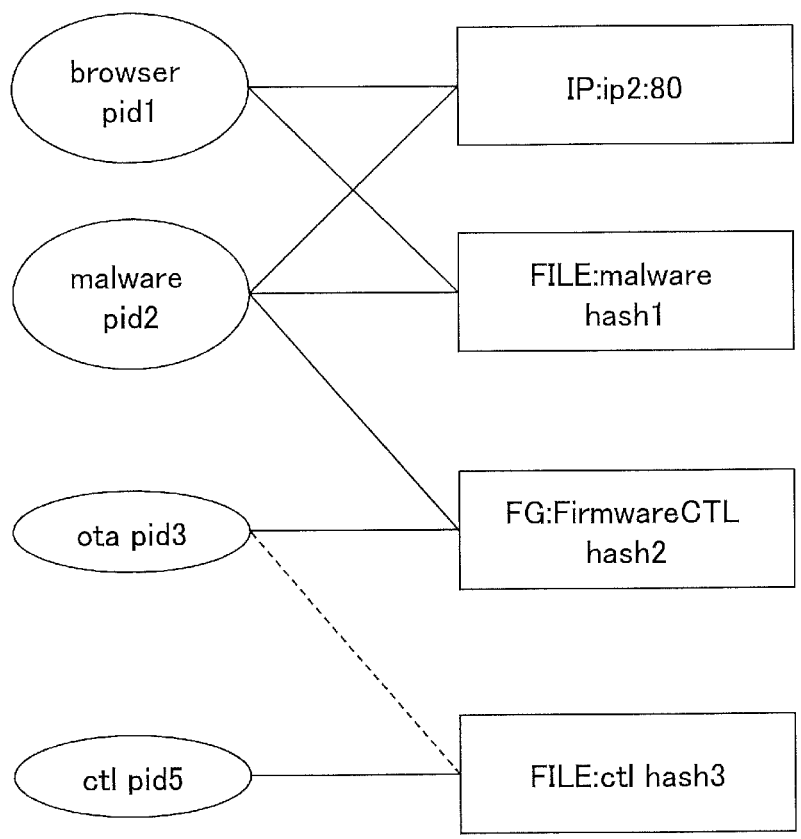
FIG. 14B is a figure illustrating a graph structure during an external attack.

FIG. 14A is a figure illustrating a graph structure under normal circumstances, and FIG. 14B is a figure illustrating a graph structure during an external attack. The graph structure under normal circumstances is obtained by joining bipartite graphs generated by the graph structure generation unit 152 from records of the log at the dates and times of t1.1 to t2.3 in FIG. 8. The graph structure during the external attack is obtained by joining bipartite graphs generated by the graph structure generation unit 152 from records of the log at the dates and times of t1.1 to t2.3 in FIG. 10. When these two graphs are compared, a process (malware pid2) and an object (FILE:malware hash1), which do not exist under normal circumstances, exist during the external attack, and a possibility of external attack can be determined. When the tracking unit 153 identifies the process (malware pid2) and the object (FILE:malware hash1) that could be an external attack, the tracking unit 153 can identify the affected range of the external attack as explained with reference to FIG. 13.

The action prohibition unit 154 prohibits an action on an object in the affected range identified by the tracking unit 153 (S105). For example, when six objects (IP:ip2:80, FILE:malware hash1, FG:FirmwareCTL hash2, FILE:ct1 hash3, IP:ip3:443, and CAN:ID2) in the affected range are identified by joining bipartite graphs as illustrated in FIG. 13, the action prohibition unit 154 prohibits actions on these six objects.

Further, a concrete example in which the monitor unit 251 obtains a log according to processing executed in the vehicle 20 is explained.

Figure 15:
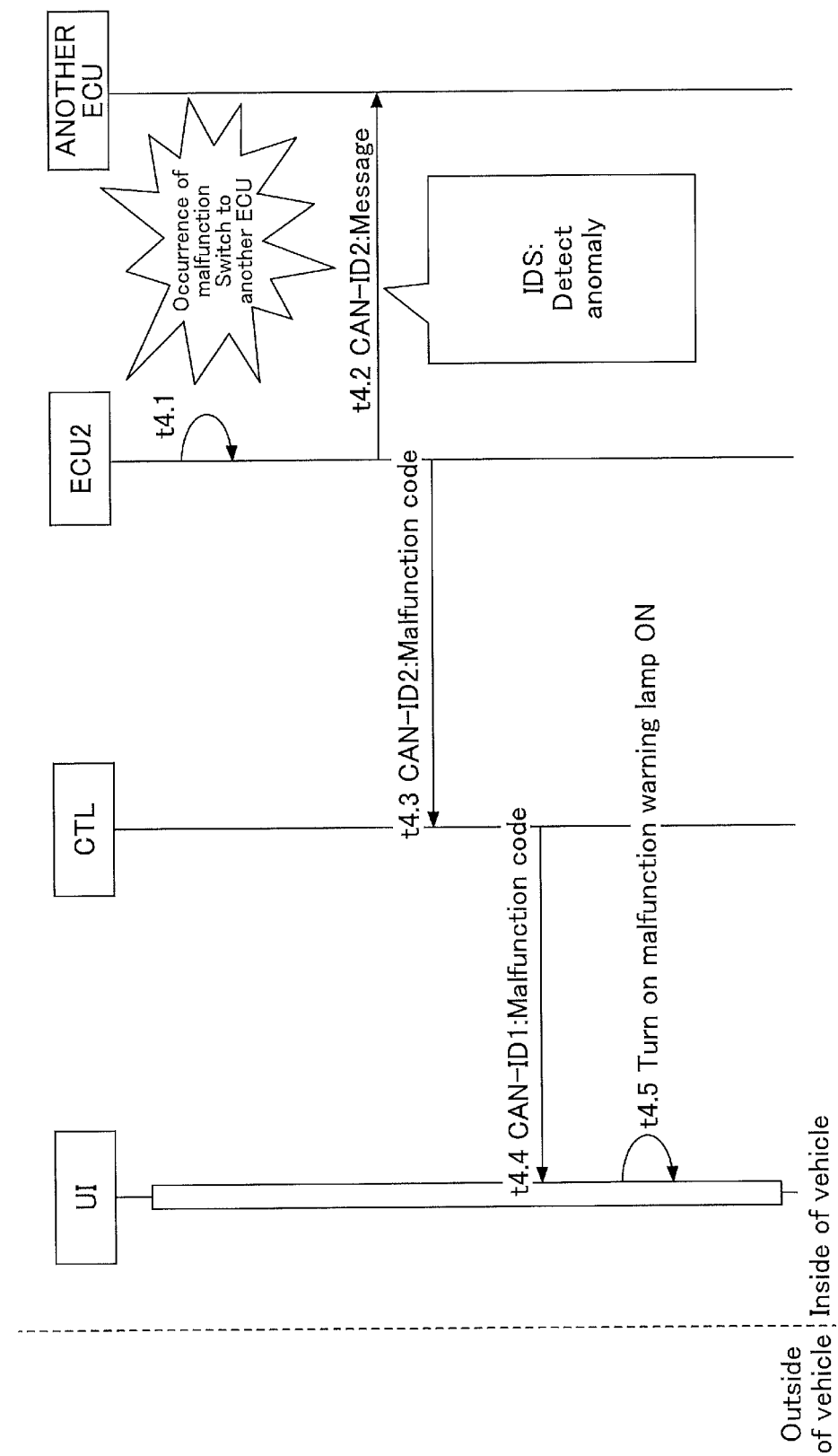
FIG. 15 is a sequence diagram illustrating an example of processing executed when a malfunction occurs.

FIG. 15 is a sequence diagram illustrating an example of processing executed when a malfunction occurs. FIG. 15 illustrates a processing subsequent to a sequence diagram illustrated in FIG. 7B or FIG. 9B.

It is assumed that, when a malfunction occurs in the ECU 2, the operation of the ECU 2 is switched to another ECU (t4.1). At that time, the ECU 2 attaches CAN-ID2 to a message and transmits the message to the another ECU (t4.2). In this case, when the IDS detects an anomaly due to, e.g., a mismatch of the state of the another ECU or a difference in time of the transmission of the message from the ECU 2 to the another ECU, the ECU 2 transmits CAN-ID2 and a malfunction code to the CTL (t4.3). When the CTL receives a malfunction code, the CTL transmits CAN-ID1 and the malfunction code to the UI (t4.4). When the UI receives the malfunction code, a malfunction warning lamp is turned on (t4.5).

FIG. 16 is a figure illustrating an example of a log obtained by the monitor unit 251 in the sequence of FIG. 15. The monitor unit 251 obtains the log in a manner similar to FIG. 8.

The first line of the log in FIG. 16 corresponds to t4.2 of FIG. 15. Note that a log cannot be obtained from the ECU 2, and therefore, a log corresponding to t4.1 does not exist. At the date and time of t4.2, a record of log is obtained with regard to an action that is executed with a process of the ECU 2 to perform malfunction detection of the ECU 2 (CAN:ID2). Likewise, at the date and time of t4.3, a record of log is obtained with regard to an action that the CTL executes to receive a malfunction code, and at the date and time of t4.4, a record of log is obtained with regard to an action that the CTL executes to transmit the malfunction code. In order to distinguish the record of log at t4.3 and the record of log at t4.4, even though the log at t4.3 corresponds to the record of log with regard to an action that the ECU 2 executes to transmit a malfunction code, CAN:ID2 of the transmission source is treated as a DST.

As explained with reference to FIG. 11 to FIG. 13, the graph structure generation unit 152 can generate a graph structure indicating an association between a process and an object.

Figure 17A:
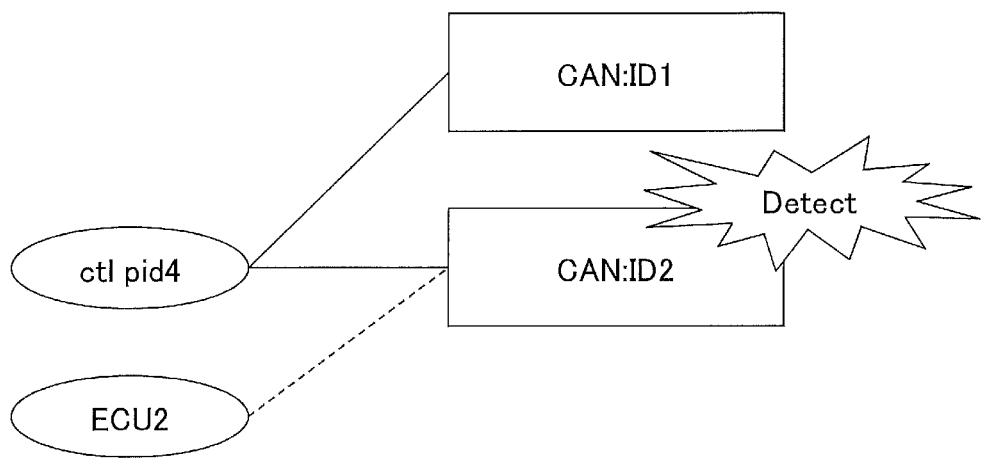
FIG. 17A is a figure illustrating a graph structure during a normal malfunction.
Figure 17B:
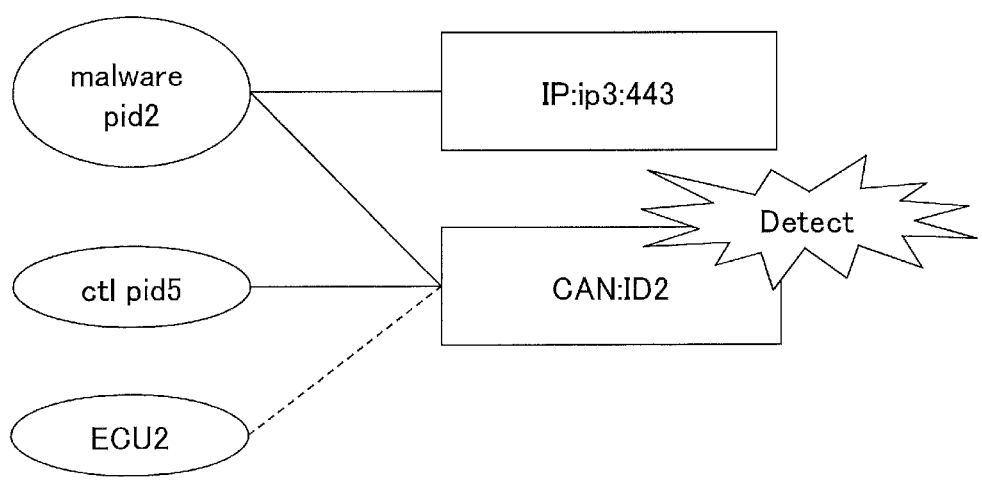
FIG. 17B is a figure illustrating a graph structure during an external attack.

FIG. 17A is a figure illustrating a graph structure during a normal malfunction, and FIG. 17B is a figure illustrating a graph structure during an external attack. The graph structure during the normal malfunction is a graph structure when a sequence as illustrated in FIG. 15 occurs subsequently to the sequence as illustrated in FIG. 7B. The graph structure during the external attack is a graph structure when a sequence as illustrated in FIG. 15 occurs subsequently to the sequence as illustrated in FIG. 9B. When these two graphs are compared, a process (malware pid2) and an object (IP:ip3:443), which do not exist during the normal malfunction, exist during the external attack, and a possibility of external attack can be determined. It can be understood that, during the external attack, an object (IP:ip3:443) for connecting to an external environment exists, but during the normal malfunction, an object for connecting to an external environment does not exist. In this manner, when an object for connecting to an unknown external environment exists, the tracking unit 153 may determine that a malfunction occurs due to an external attack.

The example as illustrated in FIG. 15 illustrates an example of turning on a malfunction warning lamp on the UI, but it is conceivable to transmit the malfunction code via the TCU to a car dealer and the like. In this case, even during the normal malfunction, there is an object for connecting to the external environment. The tracking unit 153 may determine whether a malfunction has occurred due to an external attack by referring to an allow list or a deny list configured in advance with regard to communication addresses. When, for example, there is an external address in a pathway at a time before the detection of anomaly on the basis of the order of pathways, the tracking unit 153 may determine that an attack has occurred due to an external attack.

In this manner, in the embodiments, an association between a process and an object can be expressed as a graph structure from a log. The graph structure can also be used to detect an anomaly. When a certain event is specified (for example, an anomaly is detected), a process in the affected range of the specified event and an object associated with the process can be identified by using the graph structure.

In the embodiments, the vehicle 20 has been explained as an example of a device, but the embodiments may be applied to other devices having communication functions. The embodiments may be applied to, for example, industrial control devices such as robots in factories, sensors located in various places, audio devices, home appliances, communication terminals (smartphones, tablet terminals, and the like), and devices generally referred to as IoT (Internet of Things) devices.

In a manner as described above, according to the embodiments, the affected range of an anomaly can be identified by using the graph structure, and as a result, the efficiency of the analysis for analyzing the anomaly is improved.

In addition, an anomaly can be detected by using the graph structure generated from the log and the graph structure registered as the allow list or the deny list.

In addition, whether an anomaly has occurred due to an external attack or due to an internal malfunction can be determined by using graph structures in the identification of the affected range of the anomaly.

In addition, when the affected range of an anomaly is identified, an action on an object in that range is prohibited, so that the spread of damage caused by external attacks can be prevented.

In the embodiments, the vehicle 20 is an example of a device. The monitoring server 10 is an example of an information processing apparatus. The graph structure generation unit 152 is an example of a generation unit. The tracking unit 153 is an example of an identifying unit. The action prohibition unit 154 is an example of a prohibition unit.

Hereinabove, the embodiments of the present invention have been described in detail, but the present invention is not limited to such specific embodiments. Various modifications and changes can be made within the scope of the gist of the present invention described in the claims.

The present patent application claims priority based on Japanese Patent Application No. 2018-192413, filed on Oct. 11, 2018, and the entire content of Japanese Patent Application No. 2018-192413 is incorporated herein by reference.

LIST OF REFERENCE SYMBOLS 10 monitoring server
20 vehicle
30a service provider server
30b service provider server
100 drive device
101 recording medium
102 auxiliary storage device
103 memory device
104 CPU
105 interface device
151 log reception unit
152 graph structure generation unit
153 tracking unit
154 action prohibition unit
171 log management DB
172 graph management DB
173 association information DB
210 communication device
221 CPU
222 memory device
223 auxiliary storage device
224 display device
225 input device
220 information-related sub-system
230 control-related sub-system
231 microcomputer
240 gateway device
251 monitor unit
252 anomaly determination unit
253 log transmission unit
254 graph structure generation unit
255 tracking unit
256 action prohibition unit
271 log management DB
272 graph management DB
273 association information DB
B bus

The invention claimed is:

1. An information processing apparatus comprising:
a memory; and
a processor configured to execute operations comprising:
generating, from a log obtained from a device, a graph structure, wherein the graph structure includes a first node, a second node, and a first edge, wherein the first node represents a process, the second node represents a first object of a plurality of objects, the first edge connects the first node and the second node, the first edge represents a first association between the process and a first object according to a first event of the process performing a first action upon the first object at a first time;
receiving data, wherein the data specifies the first object of the plurality of objects, and the data indicates a malfunction code using a second controller unit;
identifying, based on the first object, the process by identifying the second node and traversing the generated graph structure from the second node to the first node through the first edge; and
identifying, based on the process of the first node, a second object of the plurality of objects according to the generated graph structure;
switching, based on the malfunction code, an operation of the second controller unit of a control system to a first controller unit of the control system;
transmitting the malfunction code from the second controller unit to the first controller unit; and
detecting, by the first controller unit, based on the malfunction code, a mismatch between a first state of the first controller unit and a second state of the second controller unit, or a difference in time of the transmission of the malfunction code from the second controller unit to the first controller unit.

2. The information processing apparatus according to claim 1, wherein, when an anomaly is detected in the first object, the identifying second object further comprises:
identifying, based on the generated graph structure, the process as an anomalous process associated with the first object in which the anomaly is detected,
identifying the second object as an anomalous object associated with the identified the anomalous process,
determining whether the at least one anomalous object includes the second object connecting to an outside of the device, and
determining, based on the determination of whether the at least one anomalous object includes the second object connecting to an outside of the device, that the anomaly is caused by an external attack, based on a result of the determination.

3. The information processing apparatus according to claim 1, wherein the identifying further comprises detecting an occurrence of the external attack by comparing a first graph structure generated from a first log obtained from the device without under external attack and a second graph structure generated from a second log obtained from the device in an environment where there is a possibility of the external attack.

4. The information processing apparatus according to claim 1, wherein the generating further comprises complementing the first association in the graph structure by using association information between the process and the first object, and the process and the first object are generated in advance.

5. The information processing apparatus according to claim 1, processor further configured to execute operations comprising:
prohibiting an action on the second object by controlling access by the action to the second object.

6. A log analysis method causing an information processing apparatus to execute:
generating, from a log obtained from a device, a graph structure, wherein the graph structure includes a first node, a second node, and a first edge, wherein the first node represents a process, the second node represents a first object of a plurality of objects, the first edge connects the first node and the second node, the first edge represents a first association between the process and a first object according to a first event of the process performing a first action upon the first object at a first time;
receiving data, wherein the data specifies the first object of the plurality of objects, and the data indicates a malfunction code using a second control unit;
identifying, based on the first object, the process by identifying the second node and traversing the generated graph structure from the second node to the first node through the first edge; and
identifying, based on the process of the first node, a second object of the plurality of objects according to the generated graph structure;
switching, based on the malfunction code, an operation of the second controller unit of a control system to a first controller unit of the control system;
transmitting the malfunction code from the second controller unit to the first controller unit; and
detecting, by the first controller unit, a mismatch between a first state of the first controller unit and a second state of the second controller unit, or a difference in time of the transmission of the malfunction code from the second controller unit to the first controller unit.

7. A non-transitory computer-readable recording medium storing a computer-executable program instruction that when executed by a processor cause an information processing apparatus to execute operations comprising:
generating, from a log obtained from a device, a graph structure, wherein the graph structure includes a first node, a second node, and a first edge, wherein the first node represents a process, the second node represents a first object of a plurality of objects, the first edge connects the first node and the second node, the first edge represents a first association between the process and a first object according to a first event of the process performing a first action upon the first object at a first time;
receiving data, wherein the data specifies the first object of the plurality of objects, and the data indicates a malfunction code using a second control unit;
identifying, based on the first object, the process by identifying the second node and traversing the generated graph structure from the second node to the first node through the first edge; and
identifying, based on the process of the first node, a second object of the plurality of objects according to the generated graph structure;
switching, based on the malfunction code, an operation of the second controller unit of a control system to a first controller unit of the control system;
transmitting the malfunction code from the second controller unit to the first controller unit; and
detecting, by the first controller unit, a mismatch between a first state of the first controller unit and a second state of the second controller unit, or a difference in time of the transmission of the malfunction code from the second controller unit to the first controller unit.

* * * * *